United States Patent
Shiiyama

(10) Patent No.: US 7,756,345 B2
(45) Date of Patent: Jul. 13, 2010

(54) IMAGE COMPRESSION DATA PROCESSING METHOD, AND IMAGE COMPRESSION DATA PROCESSING APPARATUS

(75) Inventor: Hirotaka Shiiyama, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 958 days.

(21) Appl. No.: 11/536,420

(22) Filed: Sep. 28, 2006

(65) Prior Publication Data

US 2007/0076961 A1    Apr. 5, 2007

(30) Foreign Application Priority Data

Oct. 3, 2005    (JP)    ............... 2005-290370

(51) Int. Cl.
 *G06K 9/36*    (2006.01)
(52) U.S. Cl. .............. 382/232; 382/233; 382/239; 382/240
(58) Field of Classification Search ........... 382/232, 382/233, 239, 240; 341/67, 106; 386/109, 386/112; 348/E5.055; 375/240.25, E7.273
See application file for complete search history.

(56) References Cited

U.S. PATENT DOCUMENTS 6,879,726 B2 *    4/2005    Sato et al. ............... 382/239

FOREIGN PATENT DOCUMENTS

| JP | 5-290093 | 11/1993 |
| JP | 2001-160062 | 6/2001 |

\* cited by examiner

*Primary Examiner*—Anh Hong Do
(74) *Attorney, Agent, or Firm*—Fitzpatrick, Cella, Harper & Scinto

(57) ABSTRACT

There is provided an image compression data processing method, including: dividing compressed image data into plurality of compressed partial image data and describing the plurality of compressed partial image data in an arbitrary order; and describing, in any of the compressed image data and additional data associated with the compressed image data, information about a decoding order of the plurality of compressed partial image data and information about a storage address of each of the plurality of compressed partial image data.

40 Claims, 38 Drawing Sheets

FIG. 4

| T0  | T1  | T2  | T3  | T4  |
|-----|-----|-----|-----|-----|
| T5  | T6  | T7  | T8  | T9  |
| T10 | T11 | T12 | T13 | T14 |
| T15 | T16 | T17 | T18 | T19 |
| T20 | T21 | T22 | T23 | T24 |

FIG. 5

| DISPLAY MODE ID | TITLE OF DISPLAY | RE-ARRANGING INFORMATION (SPECIFIED BY TILE INDEX NUMBERS) |
|---|---|---|
| 0 | ROI | T7, T12, T17, T2, T8, T13, T18, T23, T22, T21, T16, T11,··· |
| 1 | twister | T12, T6, T7, T8, T13, T18, T17, T16, T11, T0, T1, T2,··· |
| 2 | human | T7, T12, T17, T2, T8, T13, T18, T23, T22, T21, T16, T11,··· |
| 3 | ocean | T10, T11, T13, T14, T15, T16, T18, T19, T0, T1, T2, T3, T4,··· |
| 4 | sand | T20, T10, T9, T8, T25, T15, T16, T17, T18, T19, T10, T11,··· |
|  |  |  |

FIG. 6

| TILE INDEX NUMBER | OFFSET FROM SOC IN COMPRESSED DATA | SIZE OF COMPRESSED INFORMATION IN TILE |
|---|---|---|
| T0 | 0x0020fd | 2048 |
| T1 | 0x200d22 | 1024 |
| T2 | 0x00fdeb | 3064 |
| T3 | 0x21ddfe | 2048 |
| T4 | 0x25ddfe | 1024 |
| T5 | 0x23ffbc | 3064 |
| ⋮ | ⋮ | |
| T24 | 0x332312 | 3064 |

FIG. 9

| 1 | 2 | 3 | 4 | 5 | 6 | 7 | 8 | 9 | 10 | 11 | 12 | ... |
|---|---|---|---|---|---|---|---|---|----|----|----|-----|
| T7 | T12 | T17 | T2 | T8 | T13 | T18 | T23 | T22 | T21 | T16 | T11 | ... |

FIG. 10

```
=<si:j2kmeta version="1"xmlns:mdfm="http://www.conon.jp/J2k-meta">
  =<si:hintinfo>
    =<si:tileoffset dim="25">0x0220fd  0x200d22  0x00fdeb  0x21ddfe
       0x25ddfe 0x23ffbc · · · 0x332312</mdfm:tileoffset>
    =<si:mode nummode="5">
        <si:ROI dim="25">7, 12, 17, 2, 8, 13, 18, 23, 22, 21, 16, 11, · · · <si:ROI>
        <si:twister dim="25">12, 6, 7, 8, 13, 18, 17, 16, 11, 0, 1, 2, · · · </
          si:twister>
        <si:human dim="25">7, 12, 17, 2, 8, 13, 18, 23, 22, 21, 16, 11, · · · </
          si:prism>
        <si:ocean dim="25">10, 11, 13, 14, 15, 16, 18, 19, 0, 1, 2, 3, 4, · · · </si:
          ocean>
        <si:sand dim="25">20, 10, 9, 8, 25, 15, 16, 17, 18, 19, 10, 11, · · · </si:
          sand>
    </si:mode>
  </si:hintinfo>
</si:j2kmeta>
```

FIG. 11

| 10 | 11 | 12 | 13 | 14 | T0~T4 |
|----|----|----|----|----|-------|
| 25 | 2  | 3  | 4  | 15 | T5~T9 |
| 24 | 9  | 1  | 5  | 16 | T10~T14 |
| 23 | 8  | 7  | 6  | 17 | T15~T19 |
| 22 | 21 | 20 | 19 | 18 | T20~T24 |

FIG. 12

| 1 | 2 | 3 | 4 | 5 | 6 | 7 | 8 | 9 | 10 | 11 | 12 | ... |
|---|---|---|---|---|---|---|---|---|----|----|----|-----|
| T12 | T6 | T7 | T8 | T13 | T18 | T17 | T16 | T11 | T0 | T1 | T2 | ... |

FIG. 14

| IMAGE ID | LAST ACCESS DATE AND TIME | TITLE OF DISPLAY | DATA START ADDRESS | SIZE [byte] |
|---|---|---|---|---|
| 0 | 2004.01.10.08.30.12 | ROI | 0x20000000 | 120, 224 |
| 0 | 2004.01.11.10.30.00 | twister | 0x20200000 | 120, 224 |
| 1 | 2004.01.11.15.00.30 | human | 0x20500000 | 220, 300 |
| 5 | 2004.01.06.20.45.35 | ocean | 0x18000000 | 150, 110 |
| 20 | 2004.01.08.19.20.22 | sand | 0x19000000 | 300, 500 |

FIG. 15

| IMAGE ID | TITLE OF DISPLAY | NORMALIZATION FREQUENCY |
|---|---|---|
| 1 | ROI | 0.200 |
| 1 | twister | 0.100 |
| 1 | human | 0.650 |
| 1 | ocean | 0.050 |
| 1 | sand | 0.050 |
| ⋮ | ⋮ | ⋮ |

FIG. 22

| DISPLAY MODE ID | TITLE OF DISPLAY | RE-ARRANGING INFORMATION (SPECIFIED WITH TILE INDEX NUMBER) |
|---|---|---|
| 3 | ROI | T7, T12, T17, T2, T8, T13, T18, T23, T22, T21, T16, T11,··· |
| 1 | twister | T12, T6, T7, T8, T13, T18, T17, T16, T11, T0, T1, T2,··· |
| 0 | human | T7, T12, T17, T2, T8, T13, T18, T23, T22, T21, T16, T11,··· |
| 3 | ocean | T10, T11, T13, T14, T15, T16, T18, T19, T0, T1, T2, T3, T4,··· |
| 4 | sand | T20, T21, T22, T23, T24, T15, T16, T17, T18, T19, T10, T11,··· |
| ⋮ | ⋮ | ⋮ |

FIG. 23

| KEYWORD | RE-ARRANGING INFORMATION (SPECIFIED WITH TILE INDEX NUMBER) |
|---|---|
| human | T7, T12, T17 |
| ocean | T10, T11, T13, T14, T15, T16, T18, T19 |
| sand | T20, T21, T22, T23, T24 |
| Blue sky | T0, T1, T2, T3, T4, T5, T6, T8, T9 |
| ⋮ | ⋮ |

FIG. 25

```
=<si:j2kmeta version="1"xmlns:mdfm="http://www.conon.jp/J2k-meta">
   =<si:hintinfo>
      =<si:tileoffset dim="25">0x0220fd  0x200d22  0x00fdeb  0x21ddfe
         0x25ddfe  0x23ffbc · · · 0x332312</mdfm:tileoffset>
      =<si:mode numkeyword="4">
         <si:human dim="25">7, 12, 17</si:prism>
         <si:ocean dim="25">10, 11, 13, 14, 15, 16, 18, 19</si:ocean>
         <si:sand dim="25">20, 21, 22, 23, 24</si:sand>
         <si:blue_sky dim="25">0, 1, 2, 3, 4, 5, 6, 8, 9</si:twister>
      </si:mode>
   </si:hintinfo>
</si:j2kmeta>
```

FIG. 26

| IMAGE ID | FULL PATH FILE NAME |
|---|---|
| 0000001 | C:¥img¥wife.jp2 |
| 0000002 | C:¥img¥beach.jp2 |
| 0000003 | C:¥img¥fuji.jp2 |

FIG. 27

| KEYWORD | IMAGE ID |
|---|---|
| human | 1 |
| ocean | 1, 2 |
| sand | 1, 2 |
| Blue sky | 1, 2 |
| mountain | 3 |
| planet | 3 |
| sunset | 2 |
| dog | |

FIG. 28

| SEARCH CRITERIA | human ▼ AND ocean ▼ AND Blue sky ▼ |
|---|---|
| DISPLAY CRITERIA | human ▼ OR ocean ▼ OR ▼ <br> HIGHEST PRIORITY    SECOND HIGHEST PRIORITY    THIRD HIGHEST PRIORITY |

[ DISPLAY NEXT IMAGE ]     [ END DISPLAY ]

F I G. 32

| T7 | T12 | T17 | T10 | T11 | T13 | T14 | T15 | T16 | T18 | T19 | T0 |

| T1 | T2 | T3 | T4 | T5 | T6 | T8 | T9 | T20 | T21 | T22 | T23 | T24 |

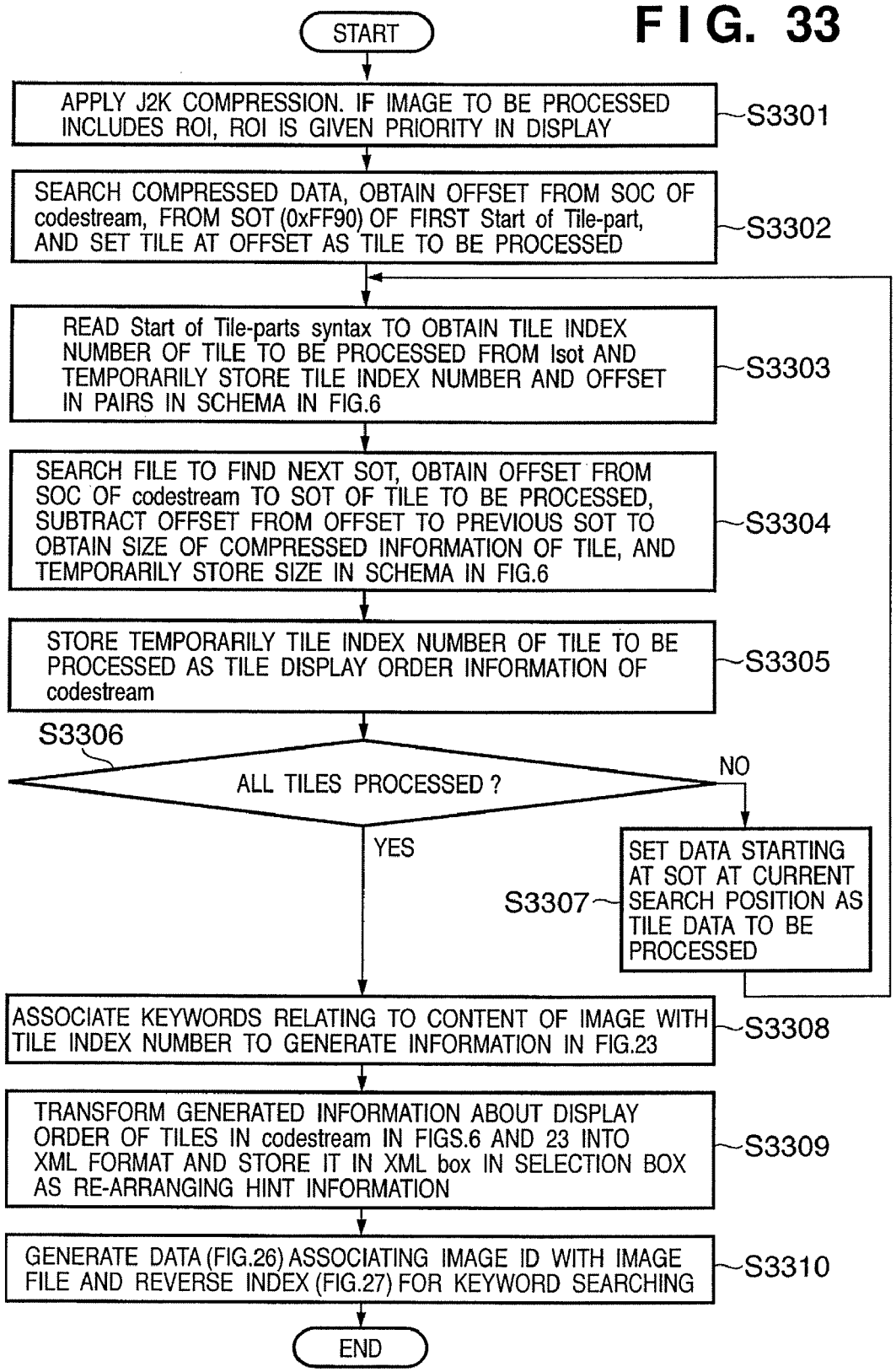

FIG. 34

```
=<si:j2kmeta version="1"xmlns:mdfm="http://www.conon.jp/J2k-meta">
  =<si:hintinfo>
    =<si:tileoffset dim="25">0x0220fd  0x200d22  0x00fdeb  0x21ddfe
       0x25ddfe 0x23ffbc • • • 0x332312</mdfm:tileoffset>
      <si:cstream dim="25">7, 12, 17, 2, 8, 13, 18, 23, 22, 21, 16, 11, • • • </si:
cstream>
      =<si:mode numkeyword="4">
         <si:human dim="5">7, 12, 17</si:prism>
         <si:ocean dim="25">10, 11, 13, 14, 15, 16, 18, 19</si:ocean>
         <si:sand dim="25">20, 21, 22, 23, 24</si:sand>
         <si:blue_sky dim="25">0, 1, 2, 3, 4, 5, 6, 8, 9</si:twister>
      </si:mode>
    </si:hintinfo>
  </si:j2kmeta>
```

FIG. 37

| 10 | 11 | 12 | 13 | 14 | T0~T4 |
|----|----|----|----|----|-------|
| 25 | 2  | 3  | 4  | 15 | T5~T9 |
| 24 | 9  | 1  | 5  | 16 | T10~T14 |
| 23 | 8  | 7  | 6  | 17 | T15~T19 |
| 22 | 21 | 20 | 19 | 18 | T20~T24 |

F I G. 38

| T12 | T6 | T7 | T8 | T13 | T18 | T17 | T16 | T11 | T0 | T1 | T2 | ... | art [k] = 12, T6, T7, T8, T13, T18, T17, T16, T11, T0, T1, T2, ...

IMAGE COMPRESSION DATA PROCESSING METHOD, AND IMAGE COMPRESSION DATA PROCESSING APPARATUS

BACKGROUND OF THE INVENTION

1. Field of the Invention

The present invention relates to an image compression data processing method and an image compression data processing apparatus that divide compressed image data into multiple pieces of compressed partial image data and are capable of describing the multiple pieces of compressed partial image data in an arbitrary order.

2. Description of the Related Art

When compressed image data is to be distributed from a sending side device (server) to a receiving side device (client), for example, sub-band encoding such as specified in JPEG2000 is first applied to the DCT blocks of the image data as disclosed in Patent Document 1. Here, DCT is an abbreviation for Discrete Cosine Transform and JPEG is an abbreviation for the Joint Photographic Experts Group.

Then, based on a specified order of reading relating to at least one of appearance definition (designation of region) or a spatial frequency band provided from the receiving side device, the sending side device reorders the data and distributes the reordered data. The receiving side device then decodes and displays or otherwise handles the data.

Patent Document 2 discloses a technique which uses JPEG2000 to determine a Region of Interest (ROI) in advance and to reorder compressed image data with priority being given to the ROI of an image hit in a keyword search or a search for an image feature amount (similar image retrieval), and then the compressed image data is distributed.

[Patent Document 1] Japanese Patent Application Laid-Open No. 5-290093

[Patent Document 2] Japanese Patent Application Laid-Open No. 2001-160062

SUMMARY OF THE INVENTION

When an image is to be divided into sub-images, a screen is divided into tiles, for example, and image data in each of the tiles is compressed first. Then, the compressed image data is reordered at the sending side device each time the data is sent, in accordance with a reading order specified by the receiving side device. However, a problem with this method is that the re-arranging of compressed image data before each transmission places a heavy processing load on the sending side device.

Furthermore, there is demand for a mechanism that avoids useless re-arranging of compressed image data by exploiting a pattern, if any, of a reading order specified by the receiving side device.

Moreover, when searching for images using keywords automatically or manually assigned to objects in the image, one often does not necessarily want to see all image to which the keywords used in the search are assigned. For example, if a stored picture of a family member "human" taken against the background of an "ocean" is searched for, keywords, <"human" and "ocean">, are typically used for the search. However, the subject to be searched is the "human". Therefore, it is useless to the searcher to communicate and display information concerning tiled image data associated with the keyword "ocean" in addition to information concerning the keyword "human".

According to an embodiment of the present invention, there is provided an image compression data processing method, comprising:

dividing compressed image data into plurality of compressed partial image data and describing the plurality of compressed partial image data in an arbitrary order; and describing, in any of the compressed image data and additional data associated with the compressed image data, information about a decoding order of the plurality of compressed partial image data and information about a storage address of each of the plurality of compressed partial image data.

According to another embodiment of the present invention, there is provided an image compression data processing method comprising:

dividing compressed image data into a plurality of compressed partial image data and describing the plurality of compressed partial image data in an arbitrary order;

assigning a keyword to an object in the image; and describing a priority decoding order of the plurality of compressed image data as hint information in any of the compressed image data and additional data associated with compressed image data so that compressed partial image data corresponding to the object to which the keyword is assigned is decoded and displayed in priority to the other partial image data.

According to yet another embodiment of the present invention, there is provided an image compression data processing apparatus, comprising:

a unit which divides the compressed image data into a plurality of compressed partial image data and describes the plurality of compressed partial image data in an arbitrary order; and a unit which describes information about a decoding order of the plurality of compressed partial image data and information about the storage address of each of the compressed partial image data, in any of the compressed image data and additional data associated with the compressed image data.

According to yet another embodiment of the present invention, there is provided an image compression data processing apparatus comprising:

a unit which divides compressed image data into a plurality of compressed partial image data and describes the plurality of compressed partial image data in an arbitrary order;

a unit which assigns a keyword to an object in the image; and a unit which describes a priority decoding order of the plurality of compressed partial image data as hint information in any of the compressed image data and additional data associated with compressed image data so that the plurality of compressed partial image data corresponding to the object to which the keyword is assigned is decoded and displayed in priority to the other partial image data.

According to these embodiments of the present invention, compressed image data in which hint information is described is distributed to a receiving side device, whereby the receiving side device can quickly reorder the received compressed image data.

Furthermore, according to the present invention, search criteria can be separated from display criteria, and a priority can be specified for an object of interest in the display criteria. Accordingly, distribution and display of tiled compressed image data can be started from a display priority region intended by a user. If tiled compressed image data searched for is not found, a jump to display of the next tiled compressed image data can be made, thereby enabling an efficient image search. Furthermore, a display order that gives priority to speed or visual quality can be reflected even in processing of regions that are not display priority regions.

Further features of the present invention will become apparent from the following description of exemplary embodiments with reference to the attached drawings.

BRIEF DESCRIPTION OF THE DRAWINGS

FIG. 4 shows the definition of a tile index number in tiled compressed image data according to an embodiment of the present invention;

FIG. 5 shows an association schema between time display mode IDs, titles of displays, and re-arranging information according to a first embodiment of the present invention;

FIG. 6 shows an association schema between tile index numbers, the positions and sizes of codestreams of tiled compressed image data according to the first embodiment of the present invention;

FIG. 9 shows an exemplary arrangement of tiled compressed image data in a codestream in which a region of interest (ROI) of the image data is displayed first and then its surrounding regions are displayed in order, according to the first embodiment of the present invention;

FIG. 10 shows an exemplary description of hint information in XML according to the first embodiment of the present invention;

FIG. 11 shows an exemplary order of display of tiled compressed image data in accordance with a spiral ordering pattern starting from the center of the image data, according to the first embodiment of the present invention;

FIG. 12 shows an exemplary order of display of tiled compressed image data in a codestream in accordance with the spiral ordering pattern starting from the center of the image data, according to the first embodiment of the present invention;

FIG. 14 shows a schema for management information concerning image data cached in a memory according to a second embodiment of the present invention;

FIG. 15 shows a schema for statistic information concerning display mode specifications according to the second embodiment of the present invention;

FIG. 22 shows an example of data in the most frequent display mode and exemplary results of re-arranging of image data based on statistic information according to the second embodiment of the present invention;

FIG. 23 shows an association schema between keywords and tiles according to a third embodiment of the present invention;

FIG. 25 shows an exemplary description of re-arranging hint information in XML according to the third embodiment of the present invention;

FIG. 26 shows an exemplary schema of indices representing association between image IDs and file names according to the third embodiment of the present invention;

FIG. 27 shows an exemplary schema of reverse index for retrieving a corresponding image ID on the basis of a keyword according to the third embodiment of the present invention;

FIG. 28 shows an example of a GUI (Graphic User Interface) for specifying search criteria and display criteria according to the third embodiment of the present invention;

FIG. 32 shows a representation of a tile arrangement in integrated display order information according to the third embodiment of the present invention;

FIG. 33 shows a process flow for generating re-arranging hint information according to a fourth embodiment of the present invention;

FIG. 34 shows an exemplary description of re-arranging hint information in XML according to the fourth embodiment of the present invention;

FIG. 37 shows an exemplary order in which data is displayed in accordance with a spiral ordering pattern, starting from the center of the data, according to the fifth embodiment of the present invention; and FIG. 38 shows an exemplary arrangement of tile index numbers for a case where data is displayed in accordance with the spiral ordering pattern, starting from the center of the data, according to the fifth embodiment of the present invention.

DESCRIPTION OF THE EMBODIMENTS

First Embodiment

An image compression data processing method and an image compression data processing apparatus of the present invention will be described below with respect to embodiments thereof.

Figure 1:
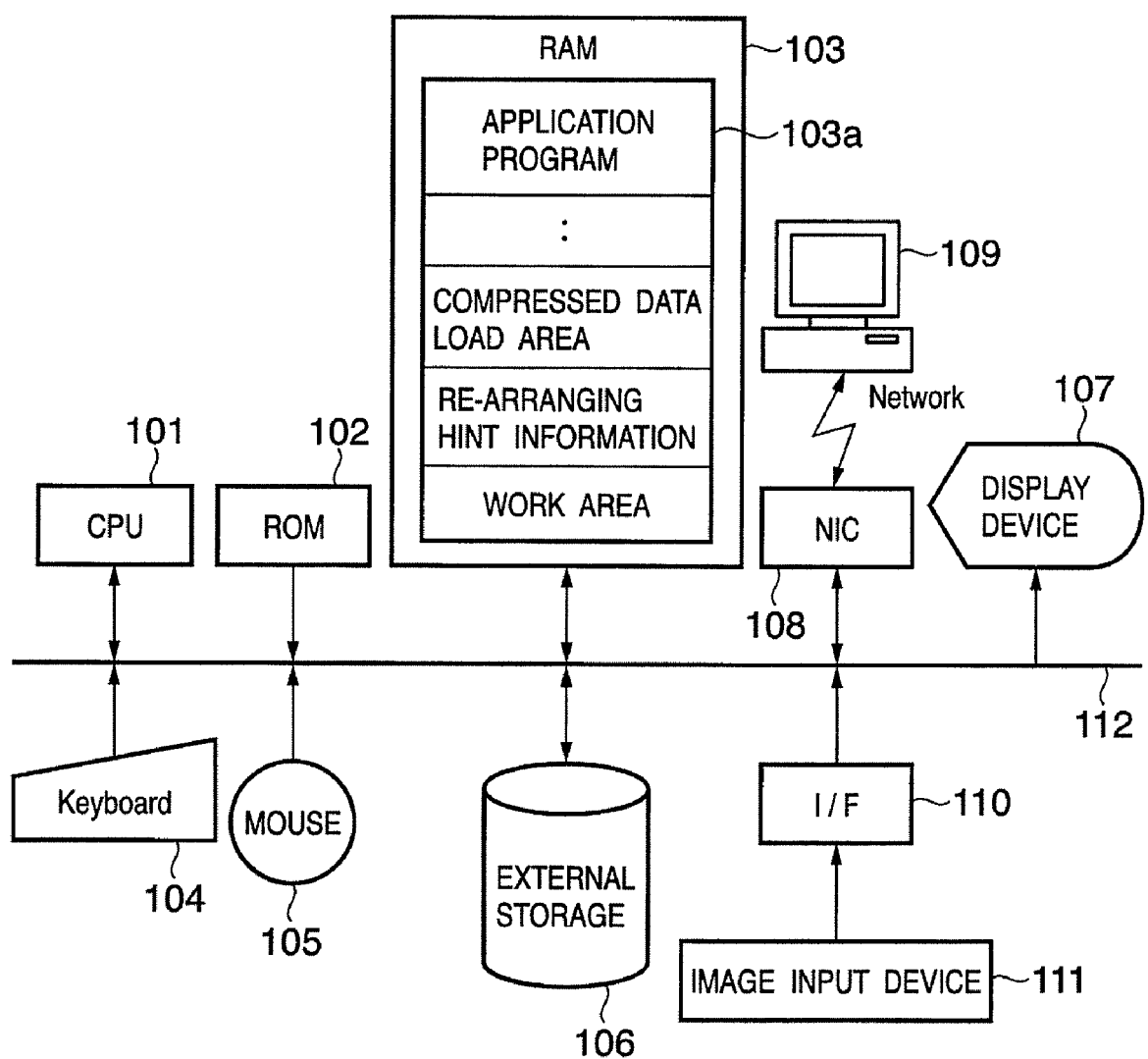
FIG. 1 shows a system configuration according to an embodiment of the present invention.

FIG. 1 shows an exemplary configuration of an image compression data processing apparatus according to an embodiment of the present invention.

In FIG. 1, reference numeral 101 denotes a CPU (Central Processing Unit), which performs various computations and control in the image compression data processing apparatus according to an embodiment of the present invention. Reference numeral 102 denotes a ROM (Read Only Memory) which stores a boot program executed during startup of the image compression data processing apparatus and fixed data. Reference numeral 103 denotes a RAM (Random Access Memory) which stores a control program for causing the CPU 101 to operate and provides a work area used by the CPU 101 for performing various kinds of control in accordance with the control program.

For example, the RAM 103 stores an application program 103a for performing processing according to embodiments of the present invention and also is used as areas in which JPEG2000 image data is loaded and re-arranging information is stored, and a work area used for compressing image data. Reference numeral 104 denotes a keyboard and 105 denotes a mouse, which provide an input operation environment allowing a user to perform input operations such as an operation for specifying a processing mode.

Reference numeral 106 denotes an external storage, including a hard disk, a flexible disk, CD-ROM, and the like. Reference numeral 107 denotes a display device such as a CRT or LCD panel display. The display device 107 is an output device. A printer can also be connected as an output device. These devices are connected to the CPU 101 through an internal bus 112. Reference numeral 108 denotes an NIC (Network Interface Card), which enables communications with other apparatuses on a network. In particular, the NIC 108 is a device which enables communications with a client terminal 109, which is a PC (Personal Computer) provided at a client site. Reference numeral 110 denotes an interface through which an image input device 111 such as an image scanner or digital camera is connected.

Figure 2:
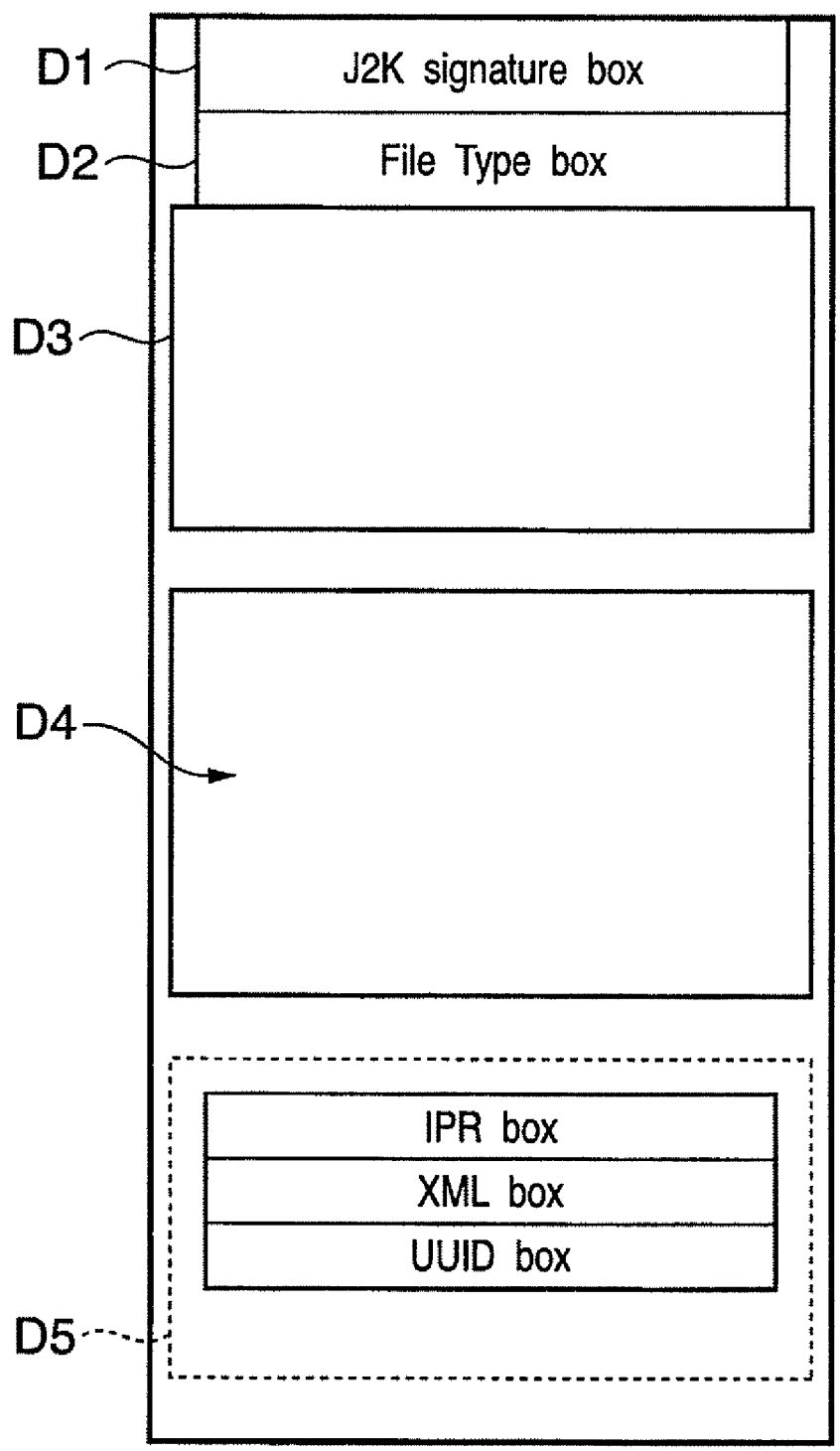
FIG. 2 schematically shows a structure of J2K (JPEG2000) compressed image data.

Operations of an embodiment of the present invention to which a JPEG2000 (hereinafter referred to as J2K) image data compression method is applied will be described. As shown in FIG. 2, J2K compressed image data comprises of data blocks, including a J2K signature box D1 for identifying a J2K file, a File Type box D2 for identifying the type of the file, a J2K Header box D3 which is general information about image data, a codestream D4 which is the main body of the compressed image data, and a selection box D5.

Figure 3A:
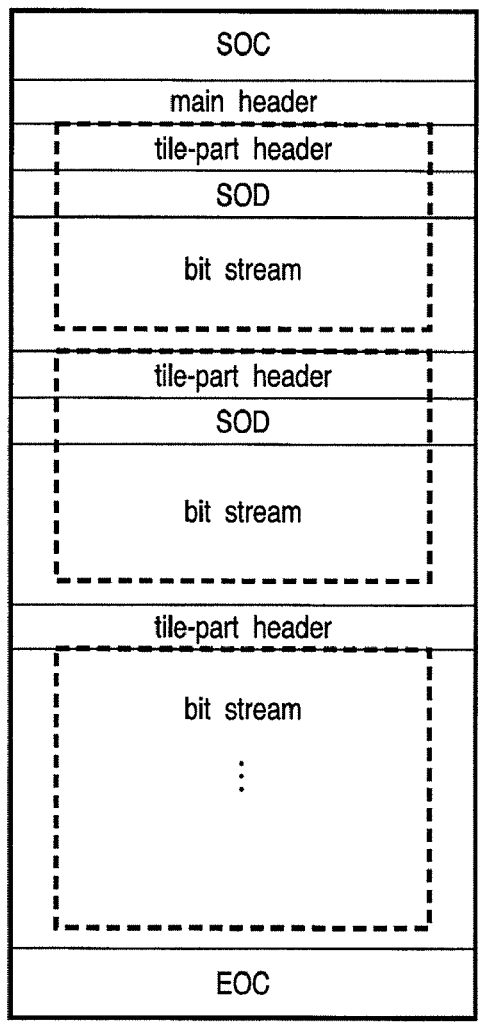
FIGS. 3A and 3B schematically show a structure of codestreams of the J2K compressed image data and a structure of the tile-part header of the J2K compressed image data, respectively.
Figure 3B:
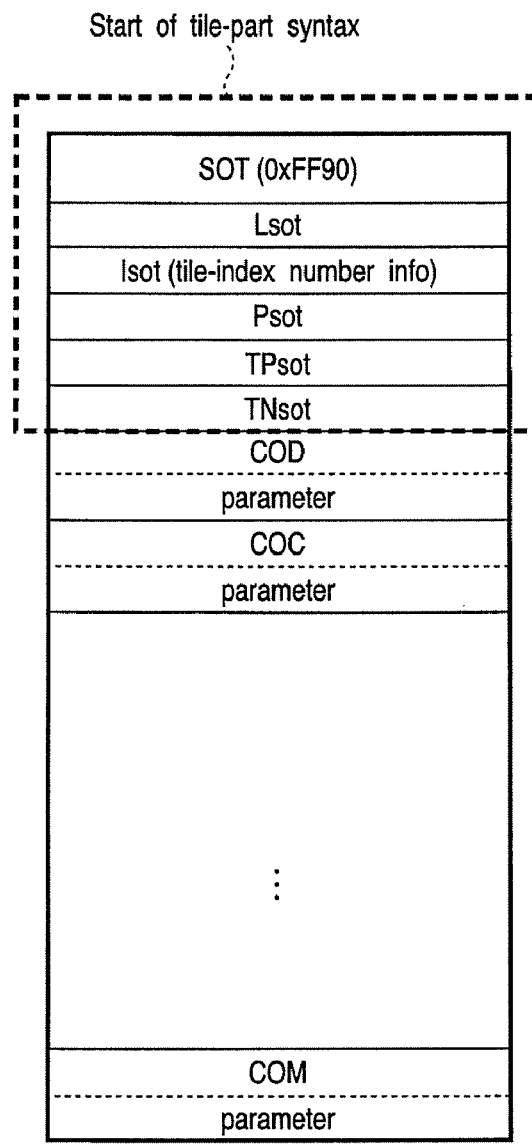

Among these data blocks, the codestream D4 is closely related to embodiments of the present invention. Details of the codestream D4 is shown in FIG. 3A. The codestream D4 is image information which starts with an SOC (Start Of Codestream: xFF4F) marker and ends with an EOC (End Of Codestream: xFFD9). The SOC marker is followed by a main header which represents information about an image compression method and packets, a tile-part header, an SOD (Start Of Data: xFF93) marker, and multiple pieces of tiled compressed image data, each being formed by a bit stream which is compressed image information in a tile. FIG. 3B shows a structure of the tile-part header included in the codestream D4 of the J2K compressed image data.

As shown in FIG. 4, tiles are compressed partial image data blocks into which an image to be compressed is divided vertically and horizontally. By compressing and decoding image data divided into tiles in this way, full advantage can be taken of the features of J2K, such as reducing memory capacity required for compression processing. In FIG. 4, tile index numbers T0-T4 are assigned to the tile images in the top row, from the left to the right, and tile index numbers T5-T9 are assigned to the tiles in the second row. Thus, 25 tile index numbers in total are given to the compressed image data divided into 25 tile images in the example in FIG. 4.

After the J2K file is distributed from the image compression data processing apparatus to the client terminal 109 and the tiled compressed image data in the codestream D4 is decoded, the tiled compressed image data will be displayed in the order shown in the table in FIG. 4. The order in which the tiled compressed image data is displayed therefore can be flexibly set by re-arranging the tiled compressed image data in the codestream D4.

In this embodiment, the client terminal 109 specifies a tile display mode ID to request the image compression data processing apparatus to display data in that tile display mode. The image compression data processing apparatus then reorders the tiled compressed image data in the codestream D4 in accordance with the sequence corresponding to the requested tile display mode ID and distributes the reordered data to the client terminal 109.

In order to perform this operation efficiently, an offset from the SOC marker in the codestream D4 of J2K compressed image data is used to describe the position of the tile-part header of each tile of tiled compressed image data, instead of using an SOT (Start of Tile-part) marker for the J2K compressed image data to refer to the tiled compressed image data. Furthermore, hint information containing order information about re-arranging of the tiled compressed image data is associated with tile display mode IDs. One example is shown in tables of FIGS. 5 and 6.

FIG. 5 shows tile display mode IDs, the titles of the displays, and re-arranging information describing, with tile index numbers, the order in which tiles are displayed. FIG. 6 shows offsets, from the SOC marker of codestream D4, of tile-part headers contained in the tiled compressed image data corresponding to the tile index numbers, and stored information indicating the sizes (capacities required for storage) of the tiled compressed image data identified by the tile index numbers.

To obtain an offset in FIG. 6, first a SOT parameter 0xFF90, shown in FIG. 3B, at the beginning of the tile-part header of a codestream D4 is searched for. Then, the tile index number described in the Isot in the SOT syntax and the offset from the SOC marker of the codestream D4 to the SOT parameter 0xFF90 can be obtained.

The re-arranging hint information can be contained in the XML box in the selection box D5 shown in FIG. 2, a comment region (not shown) of the main header of the codestream D4 shown in FIG. 3A, or a schema region that is an extension of J2K. Preferably, the re-arranging hint information is contained in a region before the codestream D4. If J2K compressed image data is managed in a DB (DataBase) system, re-arranging hint information associated with compressed image data may be stored as additional data separately from the compressed image data.

A process for generating J2K compressed image data will be described next with reference to the flowchart in FIG. 7 and the sample image shown in FIG. 8, focusing on data processing for describing re-arranging hint information in the XML box in the selection box D5.

After starting the process, image data to be processed is first compressed in accordance with J2K at step S701. If there is a region of interest (ROI), J2K compressed image data is typically generated as a codestream in the order of tile index numbers such that priority is given to the region of interest when the data is displayed.

Figure 8:
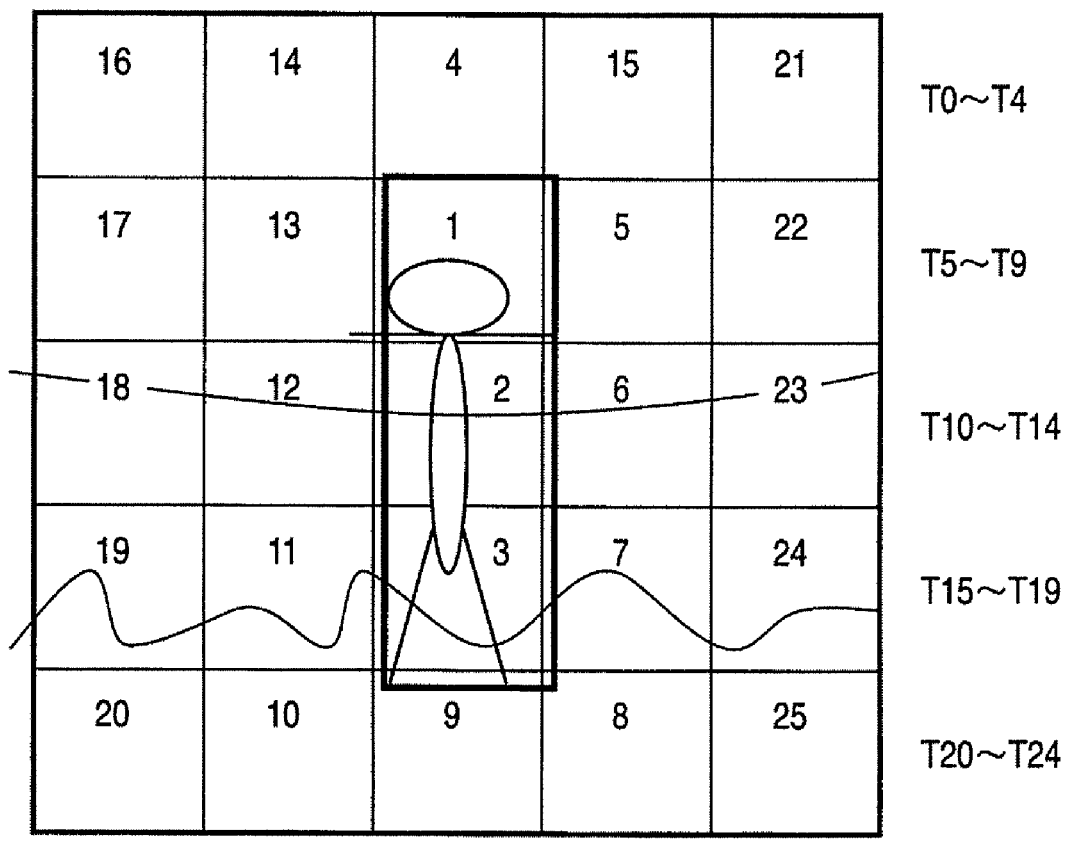
FIG. 8 shows an exemplary order of display of tiled compressed image data in which a region of interest (ROI) of the image data is displayed first and then its surrounding regions are displayed in order, according to the first embodiment of the present invention.

For example, the sample image in FIG. 8 is generated in accordance with the definitions of tile index numbers shown in FIG. 4. An image of a person appears in the tiles with tile numbers T7, T12, and T17. If this region is the region of interest (ROI), J2K compressed image data is generated as a codestream in which tiled compressed image data is arranged as shown in FIG. 9 to display the data in the order indicated in FIG. 8.

That is, when data is displayed with priority being given to a region of interest (ROI), tile index numbers of the tiled compressed image data in an actual codestream do not sequentially appear. Also, it would take too much time to check the codestream D4 to obtain the positions of tiles of tiled compressed image data in a process for re-arranging the compressed image data when the compressed image data is distributed.

Therefore, the codestream D4 is searched for the tile-part header, in particular, the SOT (Start of Tile-part: 0xFF90), and a table of association between each tile index number and the offset from the SOC marker of the codestream D4 to the SOT is generated.

For this purpose, the J2K signature box D1, File Type box D2, JP2 Header box D3, and the SOC marker and main header of the codestream D4 of the compressed image data are located and skipped at step S702. Then, the offset from the SOC marker of the codestream D4 is obtained from the SOT (0xFF90) of the first Start of Tile-part and the tile at the offset is set as the tile to be processed.

Then, at step S703, the SOT syntax is read to obtain the tile index number of the tile of the tiled compressed image data to be processed from Isot, and the tile index number and the offset are temporarily stored in pairs in a schema as shown in FIG. 6.

At step S704, the file of the compressed image data is searched for the next SOT and the offset from the SOC marker of the codestream D4 to the SOT of the tile of the tiled compressed image data to be processed is obtained. Then, the offset is subtracted from the offset to the previous SOT to obtain the size of the tile of the compressed information that is associated with the tile index number. The size is temporarily stored in the schema in FIG. 6.

At step S705, the tile index number of the current tile of the tiled compressed image data to be processed is appended and temporarily stored. This is done to know the order in which the tiles of the tiled compressed image data appear in the codestream D4 of the J2K compressed image data.

At step S706, determination is made as to whether all tiles of tiled compressed image data have been processed. If there is an unprocessed tile of the tiled compressed image data, the tile of the tiled compressed image data starting at the SOT at the current search position is set as the tile of the tiled compressed image data to be processed at step S707 and then the process returns to step S703.

On the other hand, if it is determined at step S706 that all tiles of the tiled compressed image data have been processed, determination is made at step S708 as to whether the data includes a region of interest (ROI). If it is determined at step S708 that the data includes a region of interest (ROI), the tile display mode ID, "0", is specified and the title of display "ROI" is set at step S709.

On the other hand, if it is determined at step S708 that the data does not include a region of interest (ROI), the title of display "default" is tentatively set at step S710. Then, the process proceeds to step S711, where a display title and tile re-arranging information specified using tile index numbers is set in accordance with another tile display mode ID, and then processing is performed, which will be detailed later.

Finally, re-arranging hint information shown in FIGS. 5 and 6 thus obtained is transformed into descriptions in XML as shown in FIG. 10 and the descriptions are stored in the XML box in the selection box D5 at step S712.

Setting of the title of display associated with the tile display mode ID and re-arranging information specified using the tile index numbers at step S711 will be described below. For example, consider a mode that specifies a visual-effect display order such as a mode in which tiled compressed image data is displayed in accordance with a spiral ordering pattern starting from the center of the image in image data to be processed. If the tiled compressed image data is displayed in the order as shown in FIG. 11, the tiles of the tiled compressed image data in the codestream D4 will be arranged in the order as shown in FIG. 12, which will be used as hint information. If the image data to be processed is divided into tiles in an identical manner, the tile index numbers will be ordered in a fixed pattern. Therefore, the pattern can be described as a template, namely, default hint information.

As re-arranging hint information depending on image content, information indicating the display order of objects that are specific to a type of image, such as "human (a human figure)", "ocean", and "sands," may be generated.

That is, object names are associated with tiles of tiled compressed image data and tiles of tiled compressed image data associated with an object are given priority in displaying. In this case, it will be convenient for a user if object names are used as the titles of displays of tile display mode IDs, because the user can readily anticipate the scene that will be displayed when the user selects a display mode.

The operation for associating an object with a tile and operation for associating an object name with an object may be manually performed. Alternatively, they may be automatically associated by using image-recognition-based data processing. Furthermore, tiles of tiled compressed image data that are not associated with an object are preferably displayed in an order such that they are placed around the tile of tiled compressed image data associated with the object. However, the order may be manually or automatically set.

Figure 13:
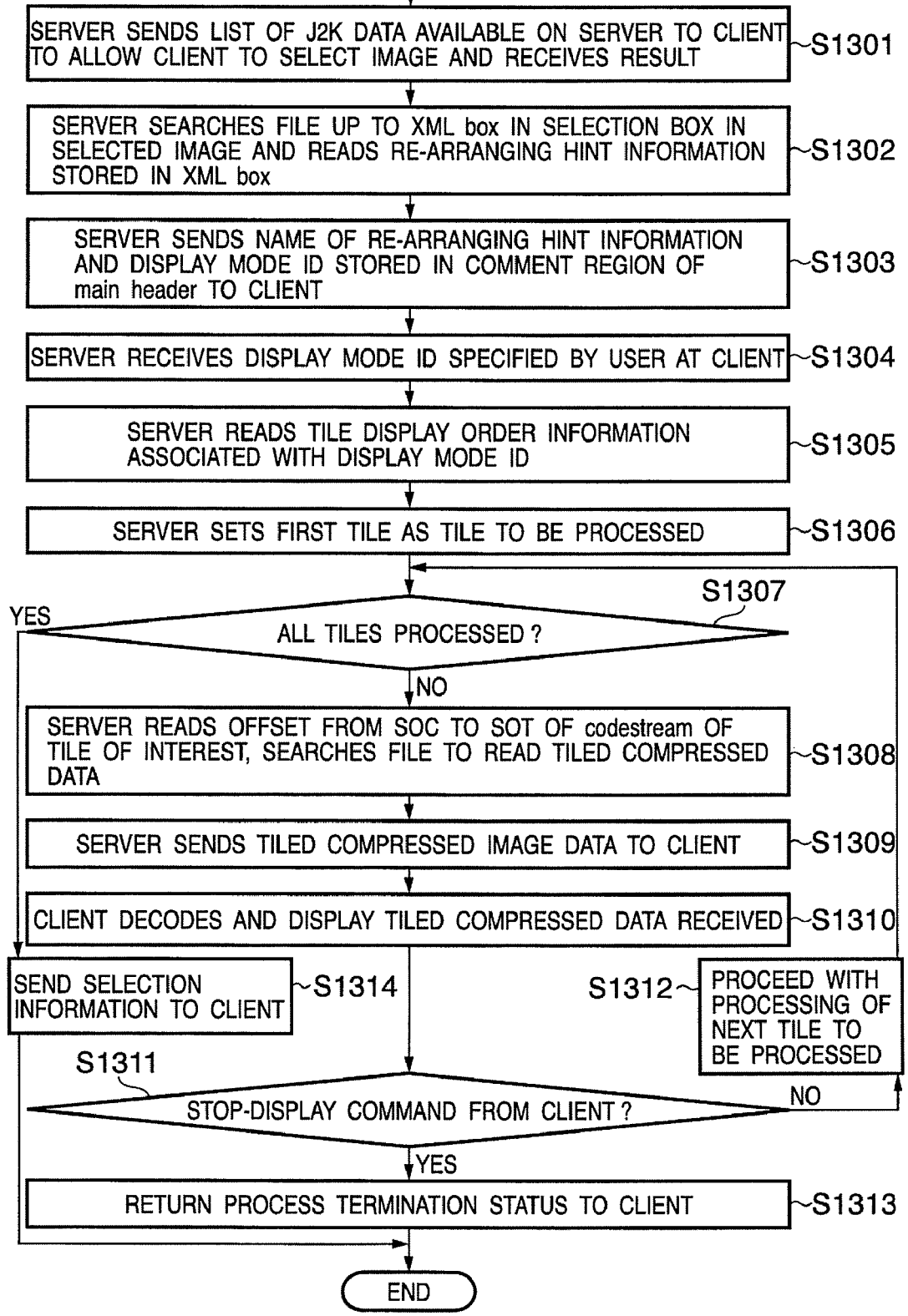
FIG. 13 shows a flow of a data distribution process using hint information according to the first embodiment of the present invention.

An example of distribution of compressed image data using hint information obtained through the process described above will be described with respect to the flowchart in FIG. 13. In the following description, the image compression data processing apparatus is referred to as a server and the client terminal 109 as a client.

First, the client searches a list of J2K compressed image data available on the server for particular J2K compressed image data at step S1301. The client then specifies image data in the group of image data group found through the search which the client wants to receive.

At step S1302, the server checks the image data up to just before the XML box in the selection box D5 of the requested J2K compressed image data requested by the client. The server then reads hint information stored in the XML box and sends the tile display mode ID or the title of display to the client. The client displays the title of display on its display device. Tile display mode IDs will be used in the following description.

In the example in FIG. 5, besides a mode in which a Region Of Interest (ROI) is displayed first by priority (display mode ID: 0), there are four display order modes: a twister display mode (in which data are displayed in a spiral ordering pattern, from the center to the periphery) (display mode ID: 1), a mode in which a human (a human figure) is given priority in display (display mode ID: 2), a mode in which an ocean is given priority in display (display mode ID: 3), and a mode in which sand is given priority in display (display mode ID: 4).

At step S1304, the server receives a tile display mode ID specified by a user on the client. For example, if the user specifies a spiral pattern display on the client, tile display mode ID "1" is provided to the server. Then, the server obtains a priority order of display represented by tile index numbers of the tiles of the tiled compressed image data from the hint information at step S1305.

Then, the tile index number at the beginning of the priority order of display of the tiled compressed image data is set at step S1306 and determination is made at step S1307 as to whether all tiles of the tiled compressed image data have been processed. If there is an unprocessed tile of the tiled compressed image data, the process proceeds to step S1308, where the server reads the offset from the SOC marker of the codestream D4 to the SOT of the tiled compressed image data to be processed.

The server then searches the tiled compressed image data for a tile-part header and reads a length of tiled compressed image data corresponding to the tile index number. The server sends the read tiled compressed image data to the client at step S1309. At step S1310, the client decodes the tiled compressed image data it received and displays it. The server then determines at step S1311 whether a stop-display command has arrived from the client. If not, the process proceeds with processing of the next tiled compressed image data at step S1312 and returns to step S1307. On the other hand, if a stop-display command has arrived, the server returns a process termination status to the client and the process will end at step S1313.

Steps S1307 through S1312 are repeated in this way until no unprocessed tiled compressed image data is left. Then, when no unprocessed tiled compressed image data is left, the server sends selection information at the end of the J2K file to the client and the process will end.

In the exemplary process flow described above, tiled compressed image data received at the client is displayed on the client in synchronization with transmission from the server. However, it will be understood that a buffer or cache can be used at the client to display received tiled compressed image data in parallel with transmission of tiled compressed image data from the server, thereby improving the efficiency of data transmission and reception.

Second Embodiments

Compressed image data using re-arranging hint information obtained as a result of the process according to the first embodiment described above is distributed as described below.

FIG. 14 shows a schema for managing image data cached in a memory. This schema is used for temporarily storing image data reordered for distribution and includes image IDs, last access dates and times, titles of display, memory addresses at which image data are stored, and image sizes. It should be noted that identical image data that is displayed in different ways is treated as different image data.

Figure 16:
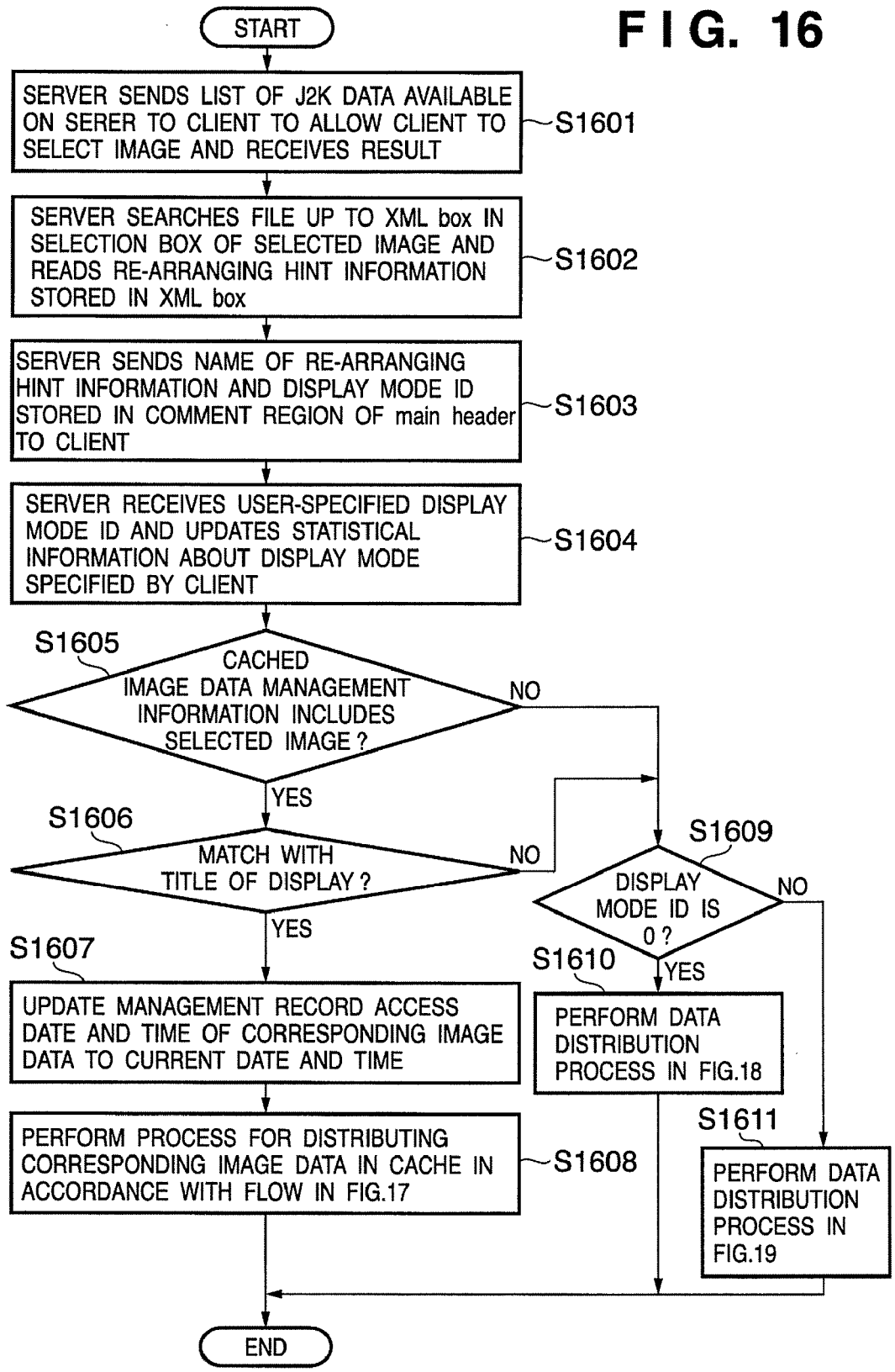
FIG. 16 shows a process flow of data distribution using re-arranging hint information according to the second embodiment of the present invention.

FIG. 15 shows an exemplary schema for statistic information concerning specified display titles. The statistic information is information represents the frequencies of display modes specified by a client for each piece of image data and is stored in association with the display titles. The frequencies are associated with the display titles because image data reordered in accordance with a data ordering pattern of the most frequent display mode is replaced with the original image data, as will be described later, and, as a result, the meaning of the display mode ID "0", which represents the original data ordering of the image data will change. FIG. 16 shows an outline process flow of a distribution process.

After the process is started, the server first sends a list of J2K compressed image data available at the server to the client to allow the client to select desired image data to be distributed and then receives the result of the selection at step S1601.

Then, the server searches the file up to just before the XML box in the selection box D5 of the selected image data and reads re-arranging hint information stored in the XML box at step S1602. At step S1603, the server sends the title of display of re-arranging hint information and display mode IDs stored in the comment region of the main header to the client.

At step S1604, the server receives a display mode ID specified by the client and updates the statistic information associated with the title of display shown in FIG. 15.

The server determines at step S1605 whether the cached image data management information shown in FIG. 14 includes the selected image data. If so, the server further determines at step S1606 whether there is a match with the title of display of the display mode ID specified by the client. If there is a match, the server updates the management record access date and time of the matching image data with the current date and time at step S1607. The server then performs a process for distributing the matching image data in the cache in accordance with the flowchart shown in FIG. 17 at step S1608. The process performed at step S1608, that is, the process shown in the flowchart in FIG. 17, will be detailed later.

On the other hand, if it is determined at step S1605 or S1606 that there is no match, the server determines at step S1609 whether the display mode ID is 0, that is, whether the order of the data is that of the image data itself. If the display mode ID is 0, the server performs the process shown in the flowchart in FIG. 18 at step S1610; otherwise, the server proceeds to step S1611, where the server performs the process shown in the flowchart in FIG. 19.

The process at step S1610, that is, the process shown in FIG. 18, and the process performed at step S1611, that is, the process shown in FIG. 19, will be detailed later.

Figure 17:
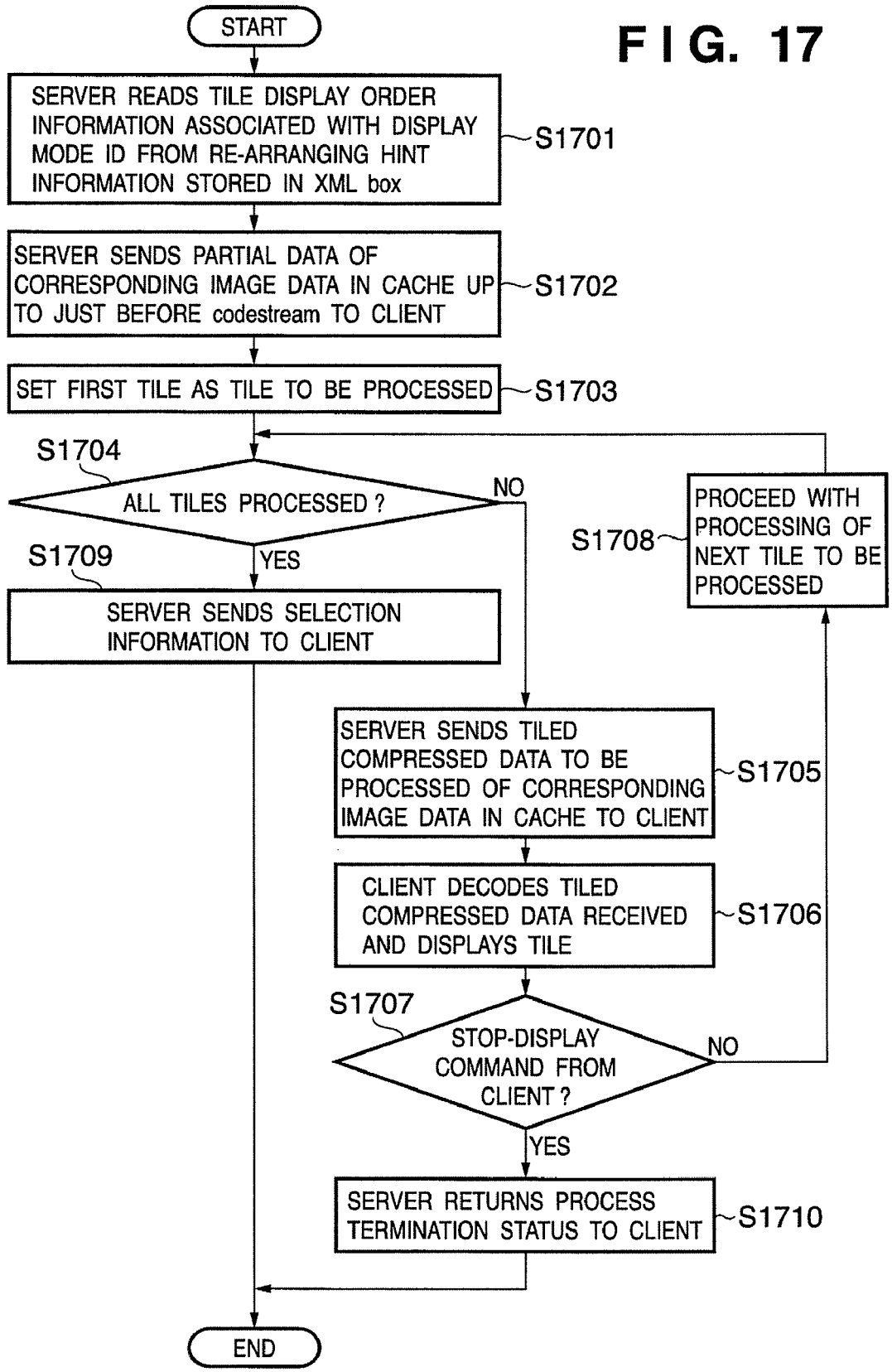
FIG. 17 shows a flow of a distribution process performed if relevant tiled compressed image data is in a cache, according to the second embodiment of the present invention.

Referring to the flowchart in FIG. 17, the process performed at step S1608 in FIG. 15 will be described next. The process flow shown in FIG. 17 is for processing image data among image data remaining in the cache that requires to be processed.

After the process is started, the server first reads re-arranging information specified with the tile index numbers associated with a display mode ID from re-arranging hint information stored in the XML box at step S1701. At step S1702, the server sends partial data up to just before the codestream of the matching image data in the cache to the client.

At step S1703, the server sets the first tile of the tiled compressed image data as the data to be processed. Then, steps S1705 through S1708 are repeated and compressed image data in each of the tiles of the tiled compressed image data is sent to the client.

In particular, determination is made at step S1704 as to whether all tiles of the tiled compressed image data have been processed. If not, the server sends the unprocessed tile of the tiled compressed image data of the matching image data in the cache that is to be processed to the client at step S1705. At step S1706, the client decodes the tiled compressed image data it received and displays the decoded tiled compressed image data. Then the process proceeds to step S1707, where the server determines whether a stop-display command is sent from the client.

If a stop-display command is not sent at step S1708, the server proceeds with processing of the next tile of the tiled compressed image data to be processed and returns to step S1704. On the other hand, if a stop-display command is received at step S1707, the process proceeds to step S1710, where the server returns a process termination status to the client. If it is determined at step S1704 that all tiles of the tiled compressed image data has been processed, the process proceeds to step S1709, where the server sends selection information to the client, and then the process will end.

Figure 18:
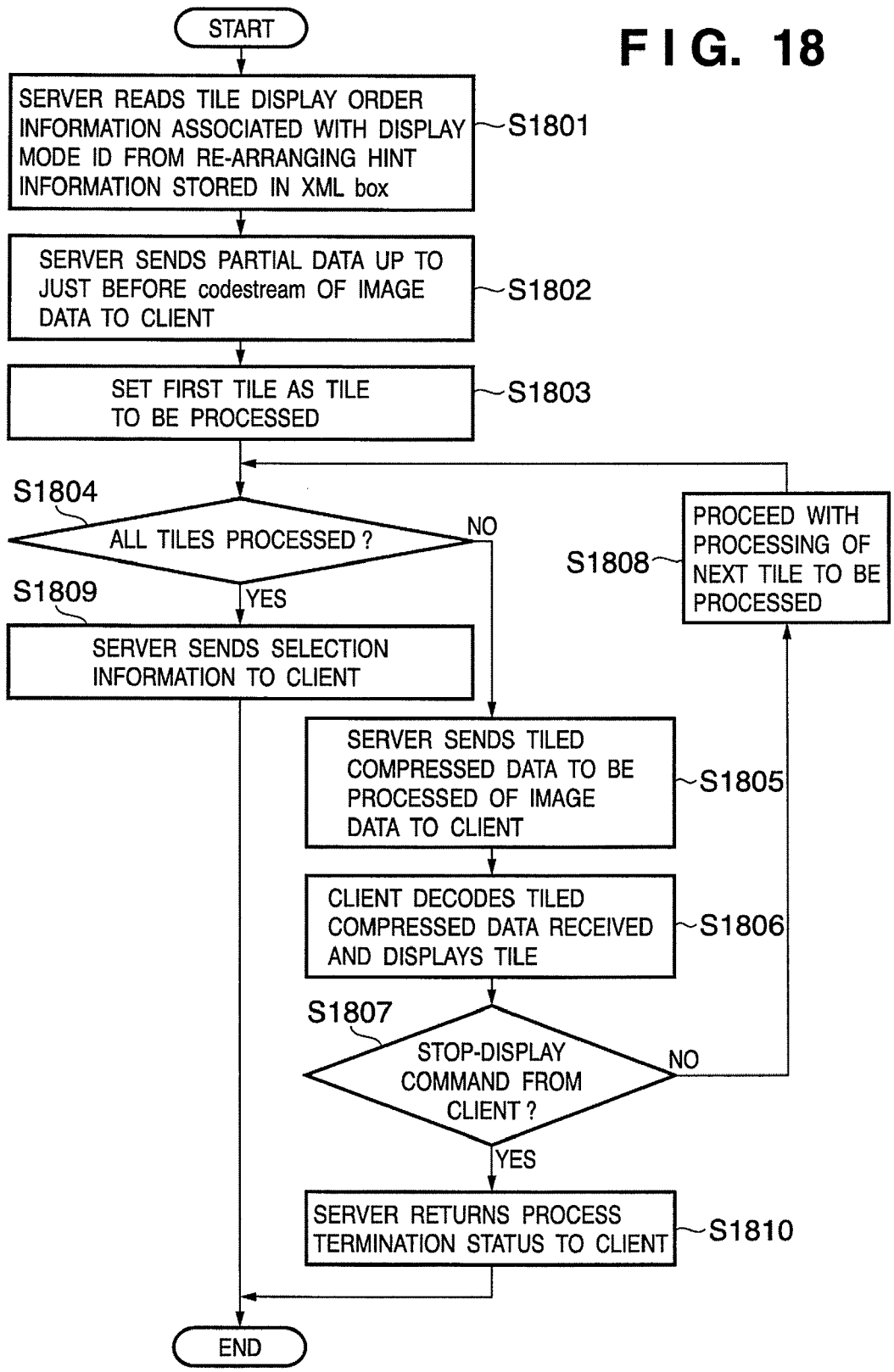
FIG. 18 shows a flow of a distribution process performed if the order of tiled compressed image data matches a specified display mode, according to the second embodiment of the present invention.

The flowchart in FIG. 18 shows a process, performed if no matching tiled compressed image data is found in the cache, for reading and sending data from the image file. In this case, the arrangement of the tiled compressed image data itself matches the display mode requested by the client.

At step S1801, the server reads re-arranging information indicated with the tile index numbers associated with the display mode ID from the re-arranging hint information stored in the XML box. The server then sends partial data up to just before the codestream of the image data to the client at step S1802. At step S1803, the first tile of the tiled compressed image data is set as the data to be processed, steps S1804 through S1808 are repeated, and compressed image data in each tile is sent to the client.

At step S1804, determination is made as to whether all tiles of the tiled compressed image data have been processed. If not, at step S1805 the server sends tiled compressed image data of the image data that is to be processed to the client. At step S1806, the client decodes the tile of the tiled compressed image data it received and displays the decoded tile of tiled compressed image data. The process then proceeds to step S1807, where the server determines whether a stop-display command is sent from the client.

If not, the server proceeds with processing of the next tiled compressed image data to be processed at step S1808 and returns to step S1804. On the other hand, if a stop-display command is sent from the client at step S1807, the process proceeds to step S1810, where the server returns a process termination status to the client. If the server determines at step S1804 that all tiles of the tiled compressed image data have been processed, the sever sends selection information to the client at step S1809 and then the process will end.

Figure 19:
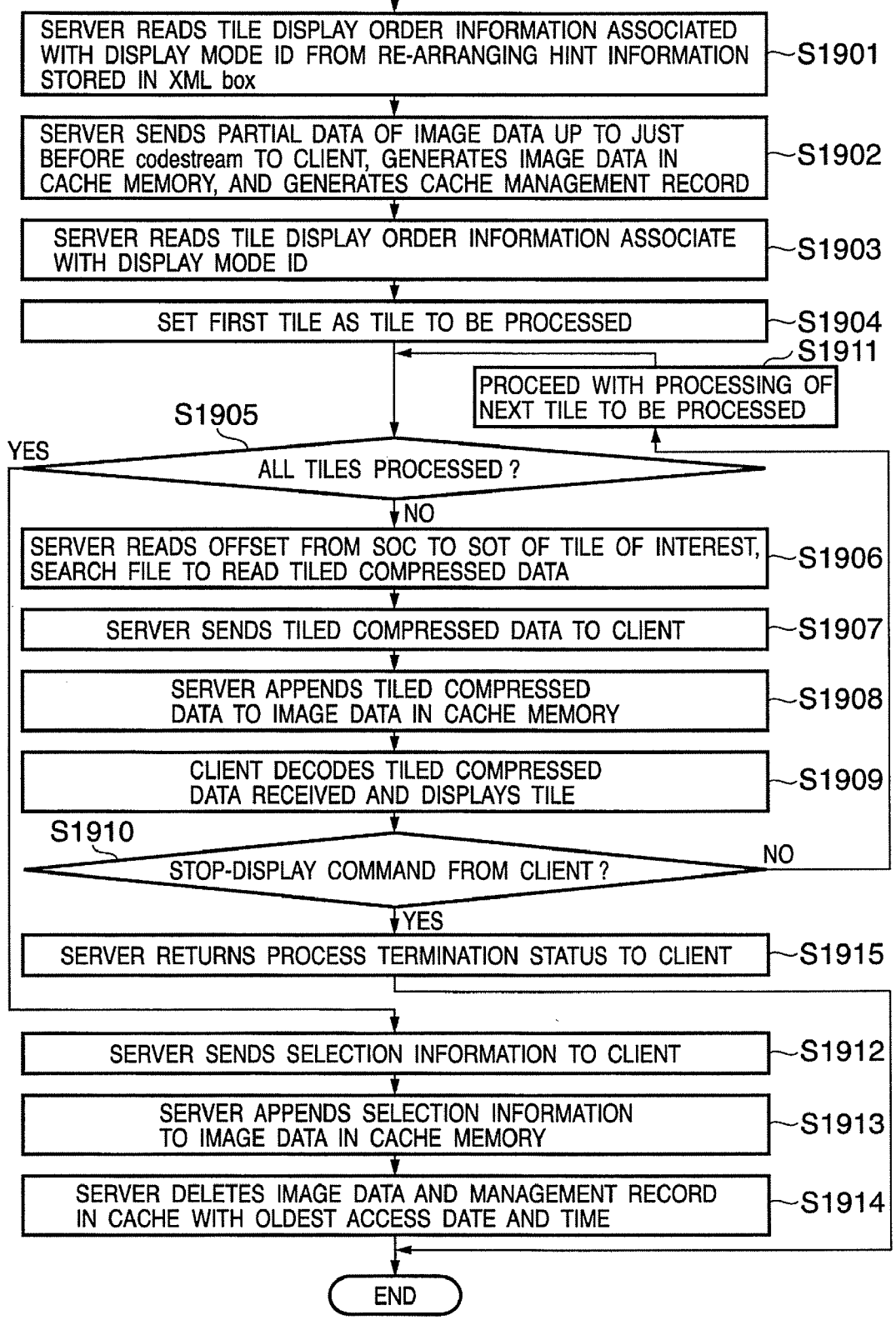
FIG. 19 shows a flow of a distribution process performed if the order of tiled compressed image data does not match the specified display mode according to the second embodiment of the present invention.

The process in the flowchart in FIG. 19 is performed if matching tiled compressed image data is not in the cache and therefore data must be read from the image file to be transmitted but the order itself of the tiled compressed image data does not match the order of the display mode specified by the client and the tiled compressed image data must be reordered.

After the process is started, the sever reads tile display order information associated with the display mode ID from the re-arranging hint information stored in the XML box at step S1901. At step S1902, the server sends partial data up to just before the codestream of the tiled compressed image data to the client, generates image data in the cache, and also generates a cache management record as shown in FIG. 14.

The server reads tile display order information associated with the display mode ID at step S1903 and then sets the first tile of the tiled compressed image data as data to be processed at step S1904. Then, steps S1905 through S1911 are repeated and compressed image data in each tile of the tiled compressed image data is sent to the client.

Determination is made at step S1905 as to whether all tiles of tiled compressed image data have been processed. If not, the process proceeds to step S1906. The server reads the offset from the SOC marker of the codestream D4 to the SOT of the tile of the tiled compressed image data to be processed, searches the file, and reads the tile of the tiled compressed image data. The server sends the read tile of the tiled compressed image data to the client at step S1907.

At step S1908, the server appends the tile of the tiled compressed image data to the compressed image data in the cache memory. At step S1909, the client decodes the tile of the tiled compressed image data it received and displays the decoded the tile of the tiled compressed image data. Then, the process proceeds to step S1910, where the server determines whether a stop-display command is sent from the client. If a stop-display command is not sent from the client, the server proceeds with processing of the next tile of the tiled compressed image data to be processed at step S1911 and then returns to step S1905.

On the other hand, if a stop-display command is sent from the client the server returns a process termination status to the client and then the process will end at step S1915.

If the server determines at step S1905 that all tiles of the tiled compressed image data have been processed, the server sends selection information to the client at step S1912 and also appends the selection information to the image data in the cache memory at step S1913. Then, the compressed image data and management record with the oldest access date and time in the cache are deleted at step S1914 and the process will end.

Figure 20:
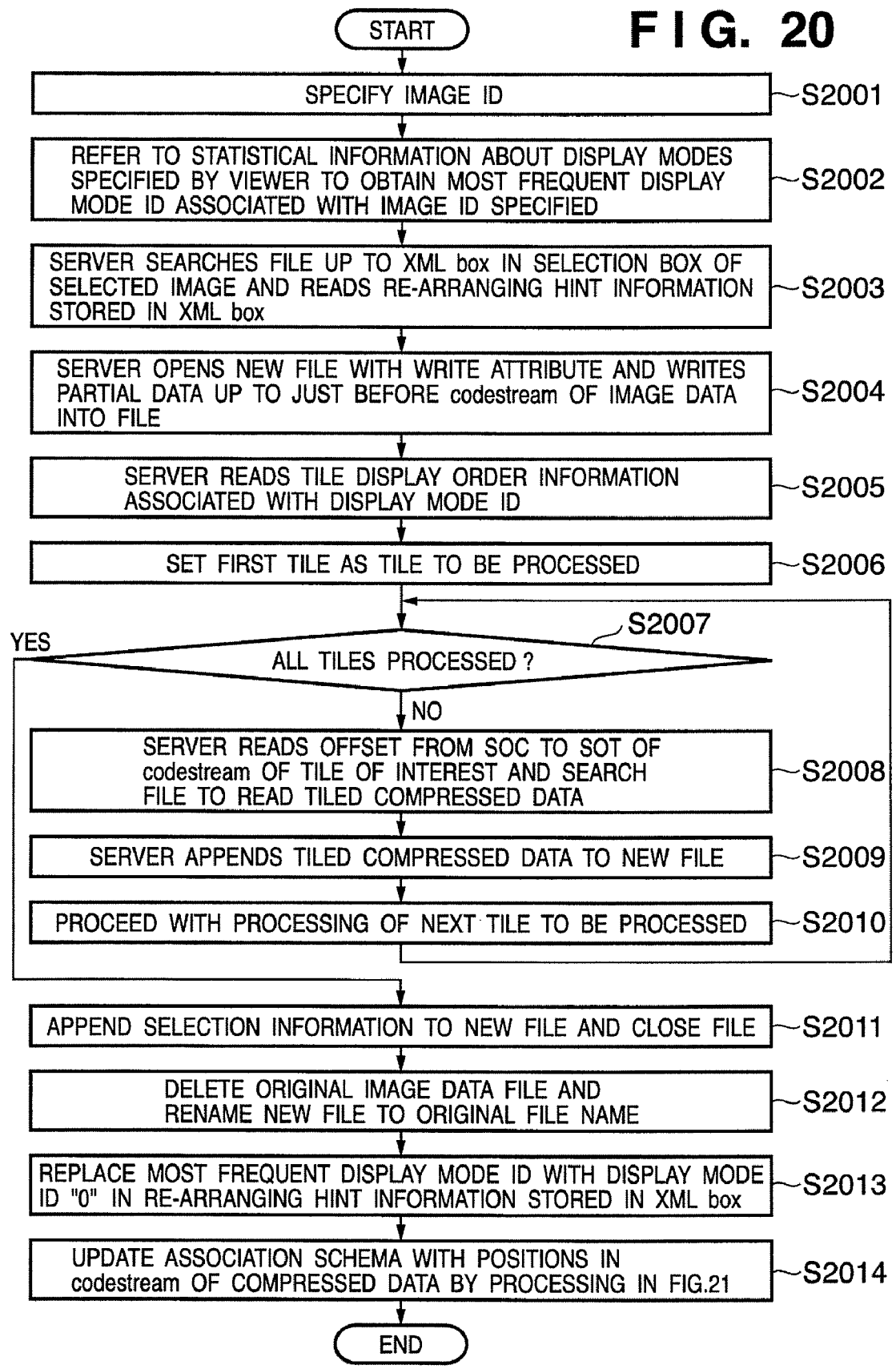
FIG. 20 shows a process flow for re-arranging data in the most frequent display mode and tiled compressed image data on the basis of statistic information of specified display mode according to the second embodiment of the present invention.

FIG. 20 shows a process in which statistic information (FIG. 15) concerning display modes specified by the client is referred to and the tiled compressed image data is reordered in accordance with the most frequent display mode based on the most frequent display mode ID for the specified image ID, and the data is updated to image data of the display mode ID "0". By performing this process, the frequency of re-arranging of the tiled compressed image data can be reduced.

This process is preferably performed during a period such as a server maintenance period in which distribution service is not performed. The process does not need to be performed for all image data at once. A deviation in the frequency may be obtained by a certain measure and the process may be applied to only image data with a frequency deviation that exceeds a predetermined threshold.

After the process is started, the image ID of an image to be processed is specified at step S2001. At step S2002, statistic information concerning display modes specified by the client is referenced to obtain the display mode ID of the most frequent display mode used with the image ID specified. Then at step S2003, the server searches the file of the selected compressed image data up to just before the XML box in the selection information and reads re-arranging hint information stored in the XML box. At step S2004, the server opens a new file with a write attribute and writes partial data up to just before the codestream of the imaged data into the file.

At step S2005, the server reads tile display order information associated with the display mode ID and at step S2006, sets the first tile of the tiled compressed image data as the data to be processed. Then, steps S2007 through S2010 are repeated until it is determined at step S2007 that all tile of the tiled compressed image data have been processed.

At step S2008, the server reads the offset from the SOC marker of the codestream D4 of the tiled compressed image data being processed to the SOT and searches the file to retrieve the tile of the tiled compressed image data. The server appends the tile of the tiled compressed image data to the new file at step S2009 and proceeds with processing of the next tile to be processed at step S2010.

If it is determined at step S2007 that all tiles of tiled compressed image data have been processed, the process proceeds to step S2011, where selection information is appended to the new file and the file is closed. Then, the original image data file is deleted and the new file is renamed to the name of the original file at step S2012. At step S2013, the most frequent display mode ID is replaced with the display mode ID "0".

Finally, the association schema between tiles in the XML box in the selection box D5 and positions in the codestream D4 is updated at step S2014 and then the process will end.

Figure 21:
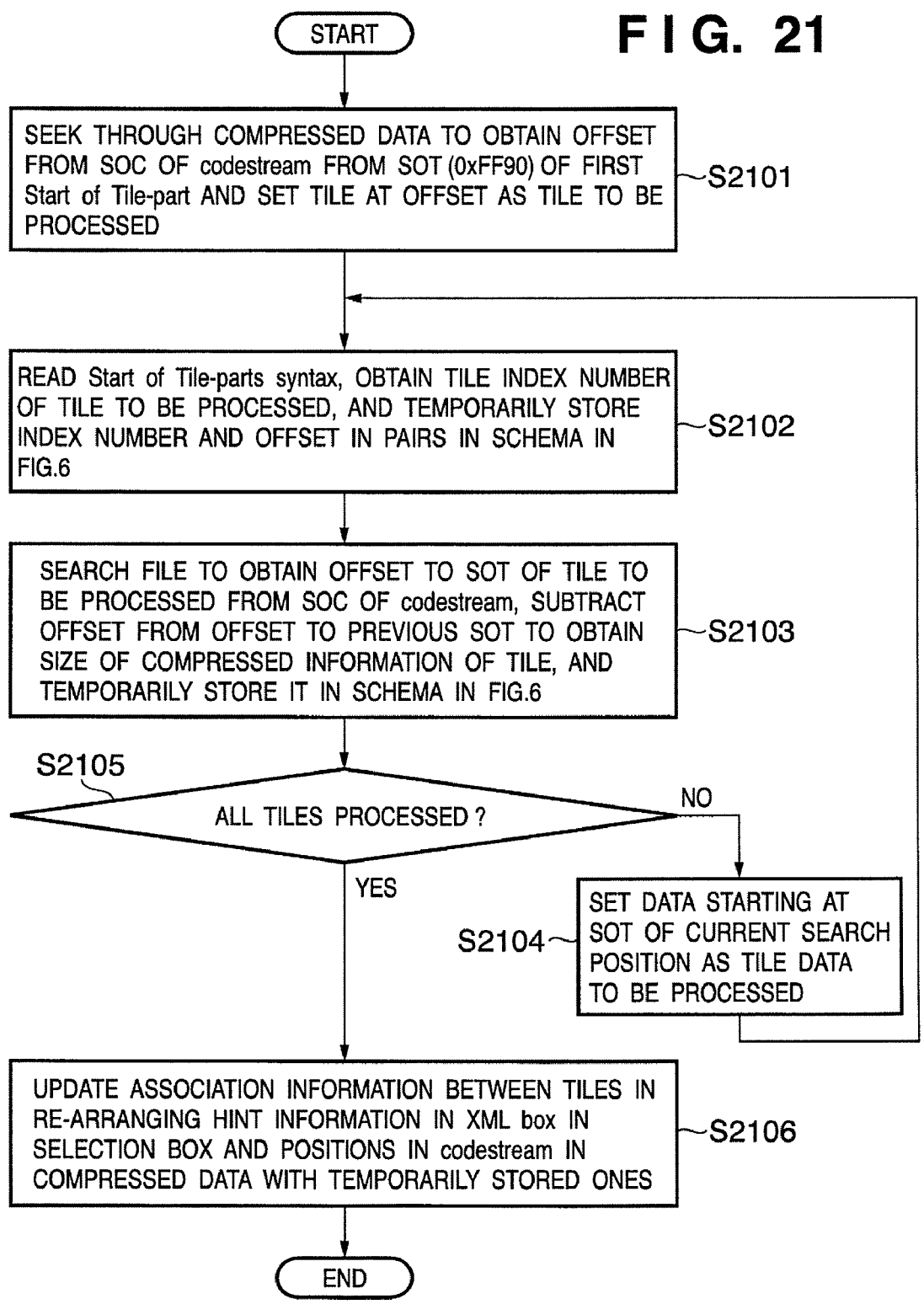
FIG. 21 shows a flow of a process for updating information about association of tiles with their positions in a codestream in the process in FIG. 20.

In FIG. 21, a process is performed for obtaining associations between tiled compressed image data and positions in the codestream D4 for the tiled compressed image data reordered in accordance with the new display order generated as a result of the process in FIG. 20.

In particular, after the process is started, at step S2101, the compressed image data is searched to return to the SOT (0xFF90) of the first Start of Tile-part, the offset from the SOC marker of the codestream D4 is obtained, and the tile of the tiled compressed image data at the offset is set as the data to be processed.

At step S2102, the Start of Tile-parts syntax is read, the tile index number of the tile of the tiled compressed image data to be processed is obtained from Isot and the index number and the offset are temporarily stored in pairs in the schema in FIG. 6. At step S2103, the file of the compressed image data is searched for the next SOT and obtains the offset from the SOC marker of the codestream D4 to that SOT. Then, the offset is subtracted from the offset of the previous SOT to obtain the size of the tile of the tiled compressed information with the tile index number and the size is temporarily stored in the schema in FIG. 6. If it is determined at step S2105 that not all tiles of tiled compressed image data have not been processed, the process proceeds to step S2104. At step S2104, the data starting at the SOT at the current search position is set as the tile data to be processed and then process returns to step S2102.

On the other hand if it is determined at step S2105 that all tiled compressed image data has been processed, at step S2106, association information between tiles of re-arranging hint information in the XML box in the selection box D5 and positions in the codestream in the compressed image data is updated by replacing it with the association information temporarily stored, and then the process will end.

FIG. 22 shows the result of the process shown in FIG. 20 performed for the case where the frequency of the display title "human" is high and the association schema between display modes and their display titles and re-arranging information shown in FIG. 5 is used. As a result, the display mode ID "0" is changed to the display title "human". The codestream of the image data is reordered as T7, T12, T17, T2, T8, T13, T18, T23, T22, T21, T16, T11, ..., and an ROI with the display title is set for the display mode ID "3" in the original order of the image data.

Third Embodiment

In a third embodiment, an association schema between keywords and re-arranging information schema indicated by tile index numbers shown in FIG. 23 is used instead of the association schema among tile display mode IDs, titles of displays, and re-arranging information shown FIG. 5 used in the first and second embodiments.

Data processing for generating an association data table between image IDs and image files and a reverse index table for keyword searching in the third embodiment will be described first with respect to the flowchart shown in FIG. 24 and the sample image shown in FIG. 8 used in the description of the first and second embodiments.

Figure 7:
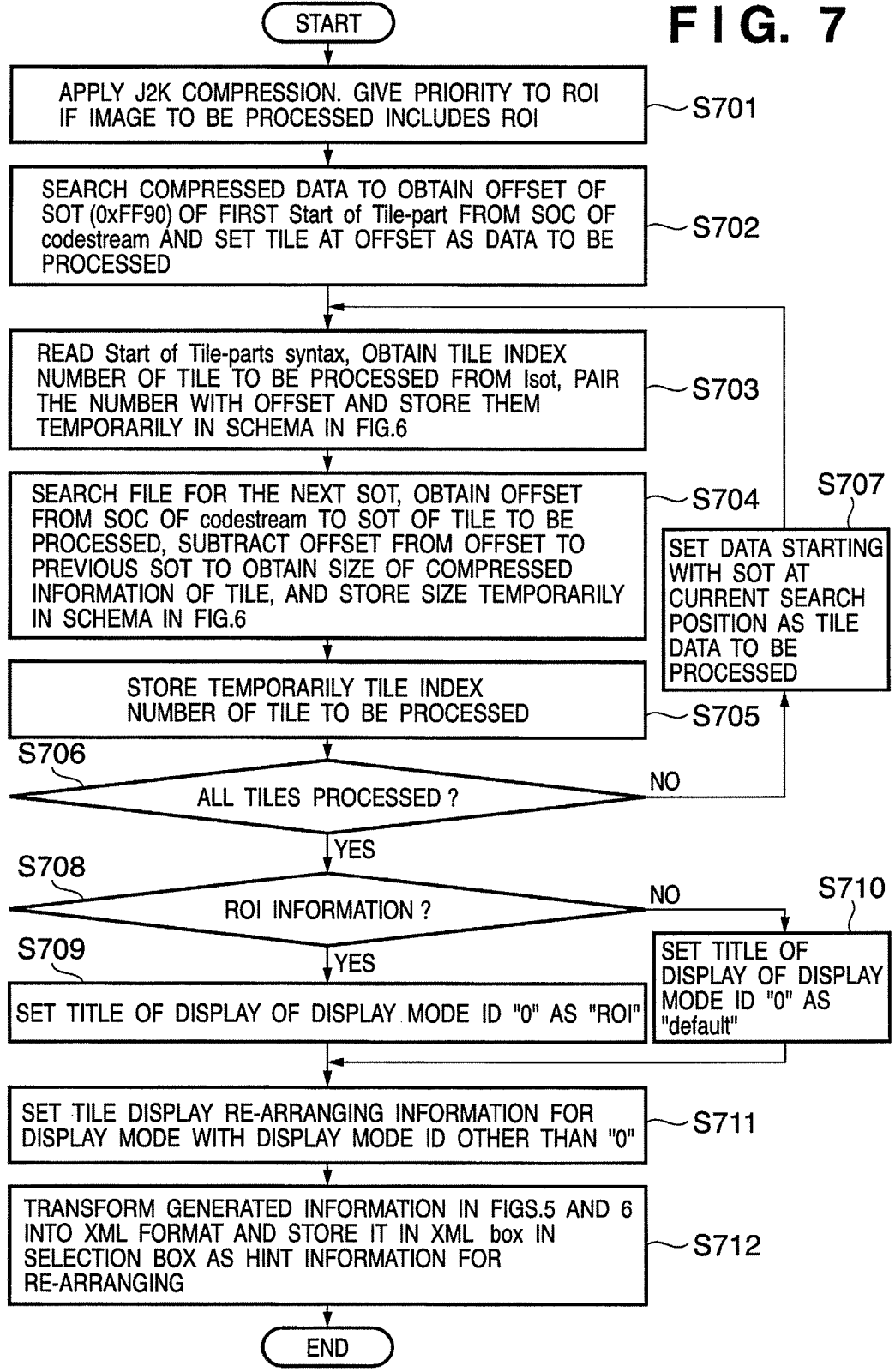
FIG. 7 shows a process flow for generating hint information according to the first embodiment of the present invention.
Figure 24:
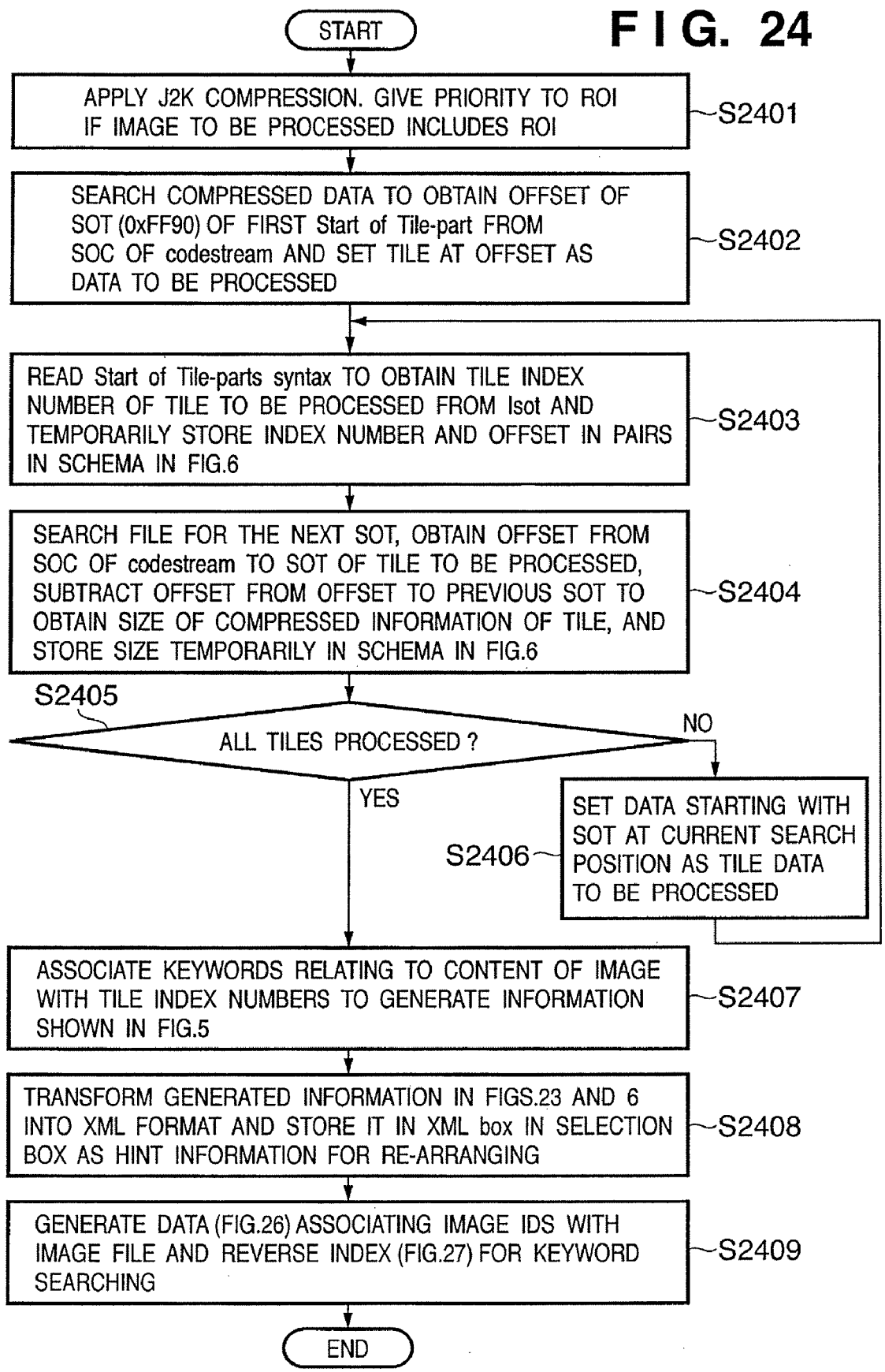
FIG. 24 shows a process flow for generating re-arranging hint information according to the third embodiment of the present invention.

Steps S2401 through S2404 in the flowchart shown in FIG. 24 are the same as steps S701 through 704 shown in FIG. 7 and described in the first embodiment and therefore the description thereof will be omitted.

At step S2405 in FIG. 24, determination is made as to whether all tiles of the tiled compressed image data have been processed. If there remains an unprocessed tile of the tiled compressed image data, at step S2406, the tile of the tiled compressed image data starting with the SOT at the current search position is set as the tiled compressed image data to be processed and then the process returns to step S2403. At step S2407, a keyword relating to display of the image is assigned to the data and the keyword is associated with a tile index number, which process will be detailed later.

At step S2408, re-arranging hint information shown in FIGS. 23 and 6 obtained as described above is described in XML as shown in FIG. 25 and the description is stored in the XML box in the selection box D5.

Finally, a table that associates image IDs with image files as shown in FIG. 26 and a reverse index table for keyword searching as shown in FIG. 27 are generated at step S2409. In particular, a unique ID is assigned to an image and a full path name index that refers from the image ID to its file name is generated. Then, reverse index as shown in FIG. 27 are generated that use keywords assigned to images as keys to directly refer to image IDs to which the keywords are assigned.

Setting of tile order information of display mode at step S2407 will be detailed next. The simplest way is to manually associate an object with tiles of tiled compressed image data using a specialized tool. In this case, a keyword to assign may be selected from abstracted keywords, which were registered in advance for consistency purpose, and the corresponding group of tiled compressed image data may be selected by using a pointing device.

Alternatively, an object that can be recognized by using image-recognition-based data processing may be automatically extracted and the name of a recognized object may be used as a keyword. The keyword may be associated with tiles of tiled compressed image data containing regions of the recognized object and stored.

Figure 29:
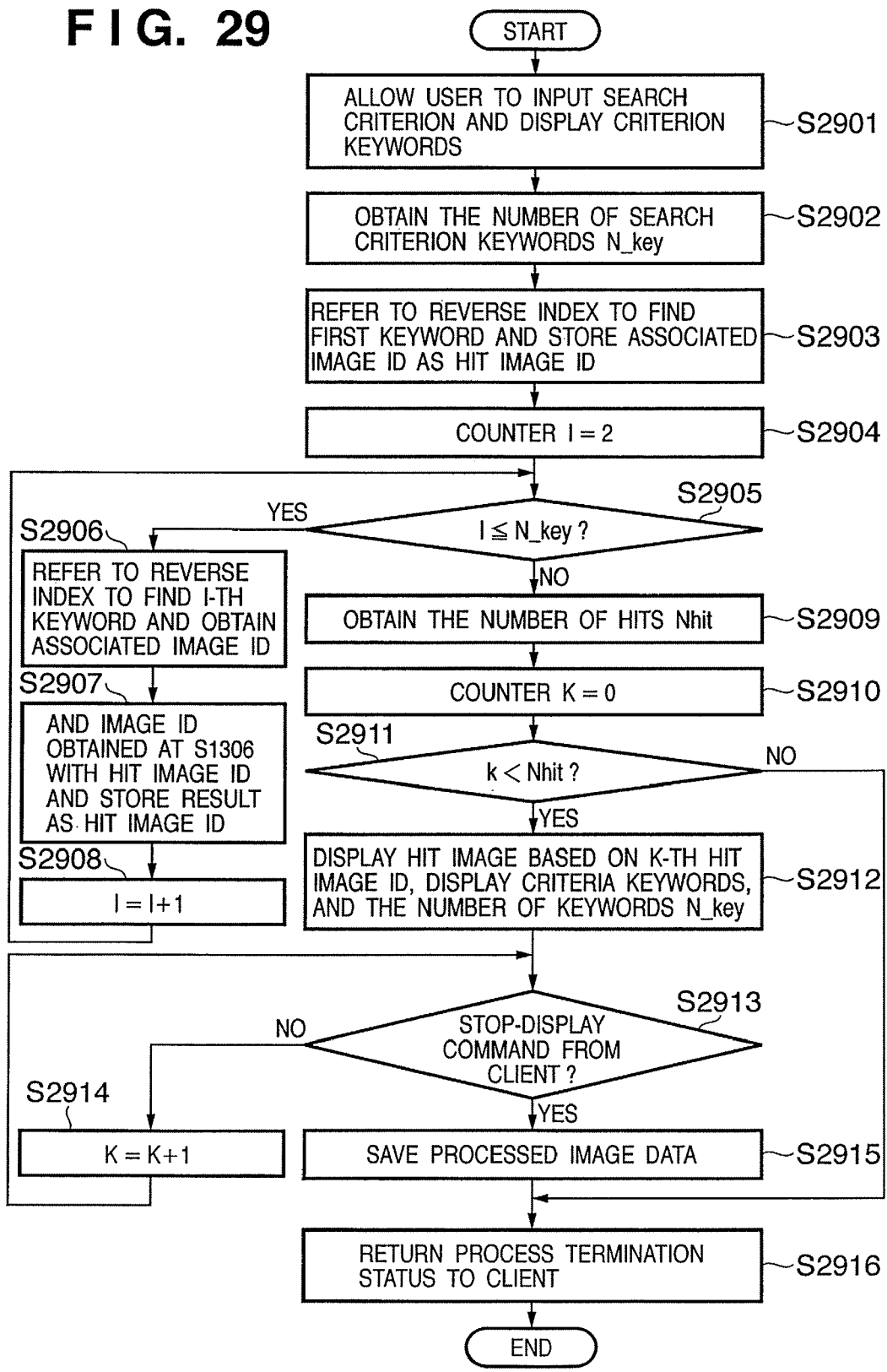
FIG. 29 shows an exemplary process flow for efficient data transfer using re-arranging hint information according to the third embodiment of the present invention.

An exemplary process for distributing tiled compressed image data using re-arranging hint information obtained as a result of the processing described above will be described with reference to the flowchart in FIG. 29.

After the process is started, a user interface as shown in FIG. 28 is first displayed on a display device at the client to allow a user to input search criterion and display criterion keywords at step S2901.

In the exemplary graphic user interface shown in FIG. 28, search criterion keywords are ANDed. In order to ensure the consistency of keywords, a user is allowed to make a selection from a predetermined list of keywords. On the other hand, display criteria can be specified independently of search criteria. Control is provided such that a keyword itself or a part of a keyword is allowed to be specified as a search criterion. Keywords that are not specified as search criteria are prevented from being used because objects corresponding to those keywords possibly do not exist.

A priority can be assigned to a display criteria and the tiled compressed image data corresponding to keywords are displayed in order, the data associated with the highest-priority keyword first.

At step S2902, the number of keywords, N_key, of the search criterion is obtained. At step S2903, the first keyword is searched for in the reverse index in FIG. 27 and the image ID associated with the keyword is stored as a hit image ID.

Because the first keyword has been processed at step S2903, a counter I is set to 2. Then, steps S2906 through S2908 are repeated until the condition I≦N_key is satisfied at step S2905, that is, all search criterion keywords are processed. At step S2906, the reverse index of the I-th keyword is referred to and the associated image ID is obtained. At step S2907, the obtained image ID is ANDed with the hit image ID and the result is stored as a hit image ID. The process then proceeds to step S2908, where the counter I is incremented by 1, and then the process returns to step S2905.

In this way, all search criterion keywords are processed and image IDs that have all search criterion keywords are searched for. Then, the process branches to step S2909.

The number of hits, Nhit, is obtained at step S2909, and then a counter K is set to 0 at step S2910. The counter K is incremented at step S2914 each time the display image is updated. This is repeated until K reaches Nhit (K>Nhit) at S2911, that is, all images are processed.

At step S2912, display processing is performed using a display method according to this embodiment. At step S2911, when the counter K reaches Nhit, that is, all images are displayed, the process proceeds to step S2916, where a process termination status is returned to the client, and then the process will end. Processing at step S2912 will be detailed later with reference to the flowchart in FIG. 30.

If a stop-display command is sent from the client at step S2913 in the process because, for example, the desired image is found, the process will end. Then, the processed image data are saved at step S2915, a process termination status is returned to the client at step S2916, and the process will end. The stop-display command may be issued by using an interface such as by pressing an "End display" button as shown in FIG. 28.

A process for displaying a specified image performed at step S2912 will be described with reference to FIG. 30.

After the process is started, an image ID, display criteria keywords, and the number of keywords N_key are received at step S3001.

At step S3002, a file name is obtained from the indices in FIG. 26 using the image ID and the J2K file with the file name is opened. At step S3003, the opened J2K file is searched up to the XML box in the selection box D5 and re-arranging hint information stored in the XML box is read.

Determination is made at step S3004 as to whether a single keyword is specified as a display criteria. If only one keyword is specified, information about the order of the tile display corresponding to the keyword is read and integrated display order information is generated at step S3005. On the other hand, if multiple keywords are specified, the process proceeds to step S3006, where the hint information is referred to and the pieces of tile display order information corresponding to the display criteria keywords are combined to generate integrated display order information. This process will be detailed with reference to the flowchart of FIG. 31 after the description of the flowchart of FIG. 30.

After the integrated display order information is generated in this way, at step S3007, the first tile compressed image data is set as data to be processed. Then the loop of steps S3009, S3010, S3011, S3012, and S3013 is repeated until it is determined at step S3008 that no unprocessed tiled compressed image data is left.

In particular, determination is made at step S3008 as to whether unprocessed tiles of tiled compressed image data are left. If so, the process proceeds to step S3009, where the server reads the offset from the SOC marker of the codestream D4 to the SOT of the tile of the tiled compressed image data to be processed. Then the file is searched to retrieve the tiled compressed image data. The read tiled compressed image data is sent from the server to the client at step S3010.

At step S3011, the client decodes the tiled compressed image data it received and displays it. The process then proceeds to step S3012, where determination is made as to whether the next display-image command arrives from the client. If so, the server returns a status indicating that the transmission of the tiled compressed image data currently being processed is terminated to the client at step S3014. On the other hand, if the next display-image command does not arrive, at step S3013, the server proceeds with processing of the next tile of the tiled compressed image data to be processed and then returns to step S3008.

Steps S3008 through S3013 are repeated until all tiled compressed image data are sent and displayed or until the next display-image command is provided from the client. After all tiles of the tiled compressed image data are transmitted and displayed, selection information at the end of the J2K file is sent to the client, and then the process will end. The next display-image command from the client may be issued by pressing a "Display next image" button shown in FIG. 28.

The exemplary process flow has been described in which tiled compressed image data is displayed at the client in synchronization with transmission of tiled compressed image data from the server. It will be understood that the transmission of tiled compressed image data from the server and the display of tile compressed image data received at the client may be performed in parallel using a buffer or cache provided at the client, thereby improving the efficiency of the transmission and reception.

Finally, the process at step S3006 for combining pieces of tile display order information corresponding to display criteria keywords to generate integrated display order information by referring to the hint information will be described with reference to the flowchart in FIG. 31.

After the process is started, the server receives display criteria keywords and the number of the keywords N_key and the total number of tiles N_tile at step S3101. Then, the keyword processing counter I is set to 1 at step S3102 and step S3104 is repeated until all display criteria keywords are processed at step S3103. In the processing at step S3104, a group of tile index numbers corresponding to the keywords to be processed is obtained from the data associating keywords with tile index numbers shown in FIG. 23 and the tile index numbers are added to the integrated display order information in the order in which they appear in the data shown in FIG. 23.

The integrated display order information has been generated in the process described above in which the tile index numbers of tiles to be given priority in display are reflected.

However, there are additional tile index numbers that are not yet reflected. Therefore steps S3105 through S3108 are performed to reflect those tile index numbers yet to be reflected in the integrated display order information.

First, the tile index number counter K is set to 0 at step S3105. If the tile index number counter K does not reach the total tile number N_tile at step S3106, the integrated display order information is checked at step S3107 to see whether a tile index number TK is included in the integrated display order information. If the tile index number TK is not included in the integrated display order information, it is appended to the integrated display order information; otherwise, the process returns to step S3106. This process is repeated to reflect all tile index numbers that were not reflected in the integrated display order information at step S3105. Thus, tiled compressed image data to be displayed are prevented from being omitted from being displayed.

FIG. 32 shows the sequence of the integrated display order information for the case where the keyword "human" is specified as the highest-priority keyword and the keyword "ocean" as the second-highest-priority keyword in the graphic user interface (GUI) in FIG. 28 and the integrated display order information is adapted to the hint information described in XML in FIG. 25.

In this embodiment, tile index numbers that are not yet reflected in the integrated display order information at step S3105 are added to the integrated display order information in ascending order of tile index number. However, they do not needed to be added in ascending order; they may be added in descending order or otherwise.

Fourth Embodiment

Figure 31:
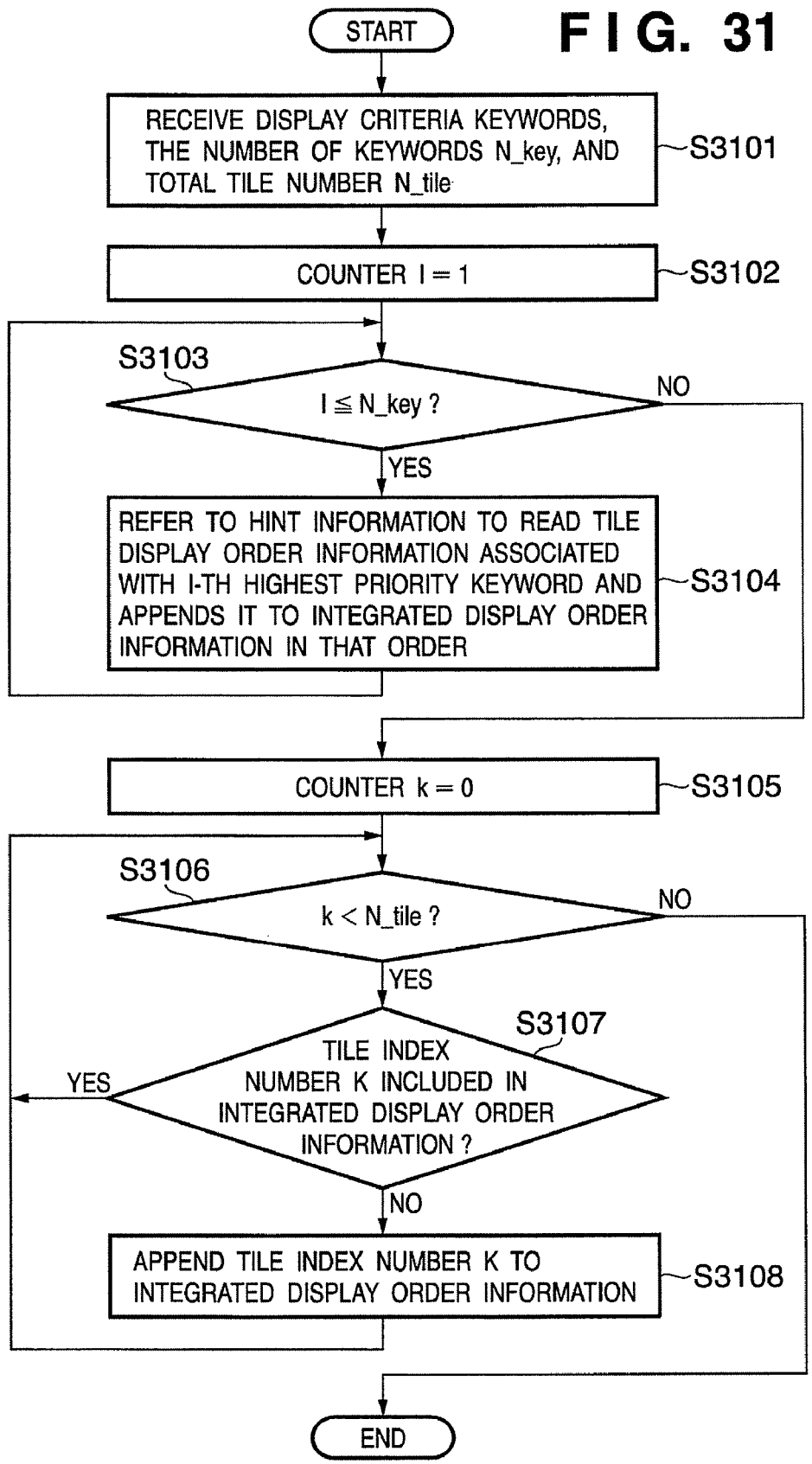
FIG. 31 shows a process flow for generating integrated display order information at step S3006 shown in FIG. 30 according to the third embodiment of the present invention.

A fourth embodiment relates to steps S3105 through S3108 in FIG. 31 in the third embodiment, that is, a process for reflecting tile index numbers that are not reflected in integrated display order information. In the fourth embodiment, indices are ordered with a view toward increasing the speed of file access, rather than arranging them in ascending or descending order. The difference with the third embodiment is only described.

The flow shown in FIG. 33 in the fourth embodiment corresponds to the process flow for generating re-arranging hint information in FIG. 24 in the third embodiment. Differences from the third embodiment are that step S3305 is added and that information about the ordering of tile indices in the codestream D4 is added to hint information at step S3309.

The addition of step S3305 enables retrieval of tile index order information in the codestream D4 of tiled compressed image data to be processed. Furthermore, this information is placed in "cstream" in data described in XML shown in FIG. 34, which differs from the data descried in XML in the third embodiment shown in FIG. 25.

Figure 35:
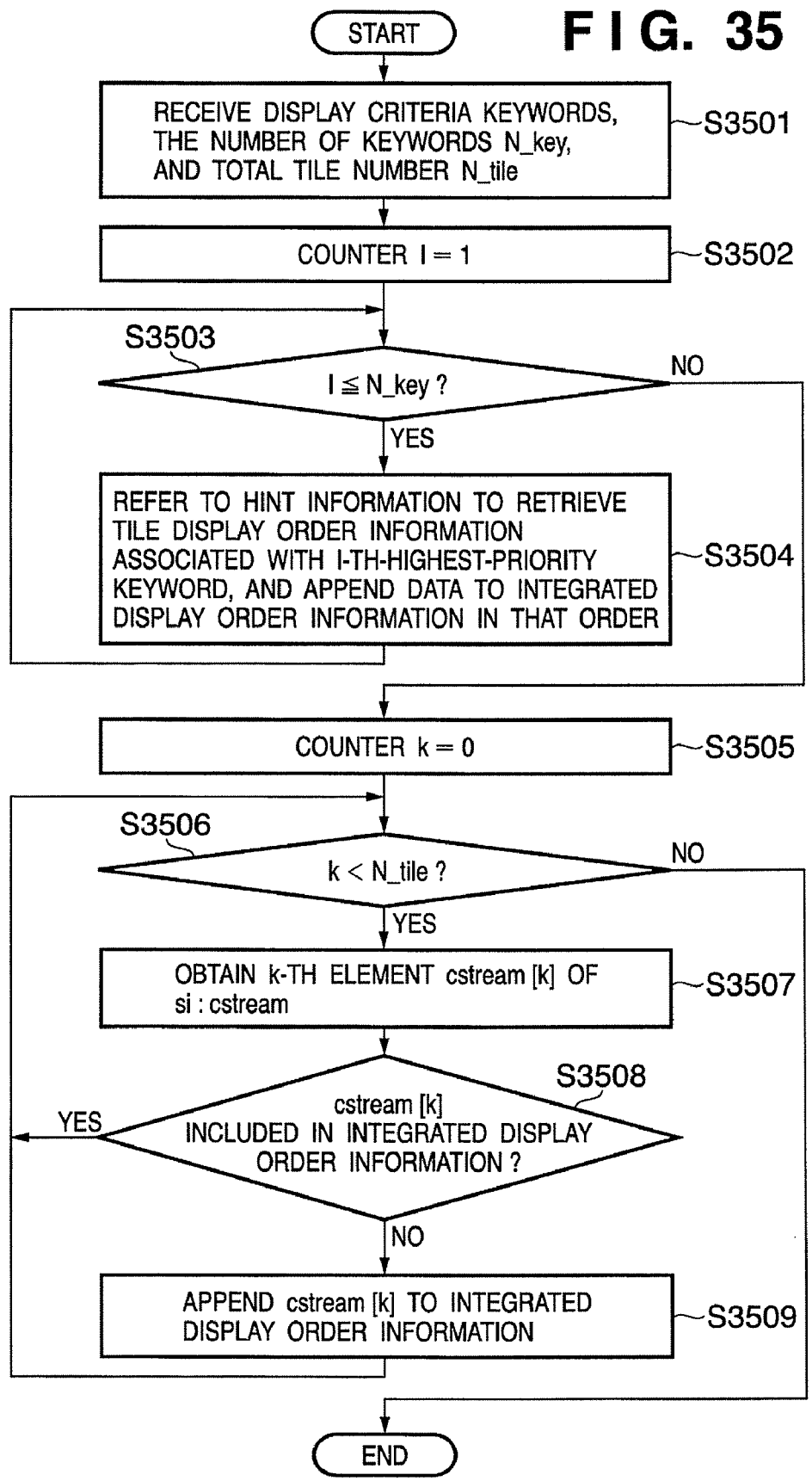
FIG. 35 shows a process flow for generating integrated display order information according to the fourth embodiment of the present invention.

The flow shown in FIG. 35 corresponds to the flow shown in FIG. 31 in the third embodiment. Steps S3507 through S3509 in FIG. 35 differ from S3106 through S3108 in FIG. 31.

In the third embodiment, comparison of tile index numbers at step S3107 is performed in order starring with tile index number T0 to determine whether a tile index number is included in the integrated display order information and, if a tile index number is not included in the integrated display order information, the number is added to the integrated display order information at step S3108. In the fourth embodiment, first for the k-th tile index number in a codestream D4, the codestream sequence in XML data in FIG. 34 is obtained by referring to the tile arrangement in the codestream D4, starting from the beginning of the tile arrangement, and determination is made as to whether the k-th tile index number is included in the integrated display order information. Then, the K-th tile index number is compared with the tile index numbers in the integrated display order information at step S3508. If the K-th tile index number is not included in the integrated display order information, it is added to the integrated display order information at step S3509.

Figure 30:
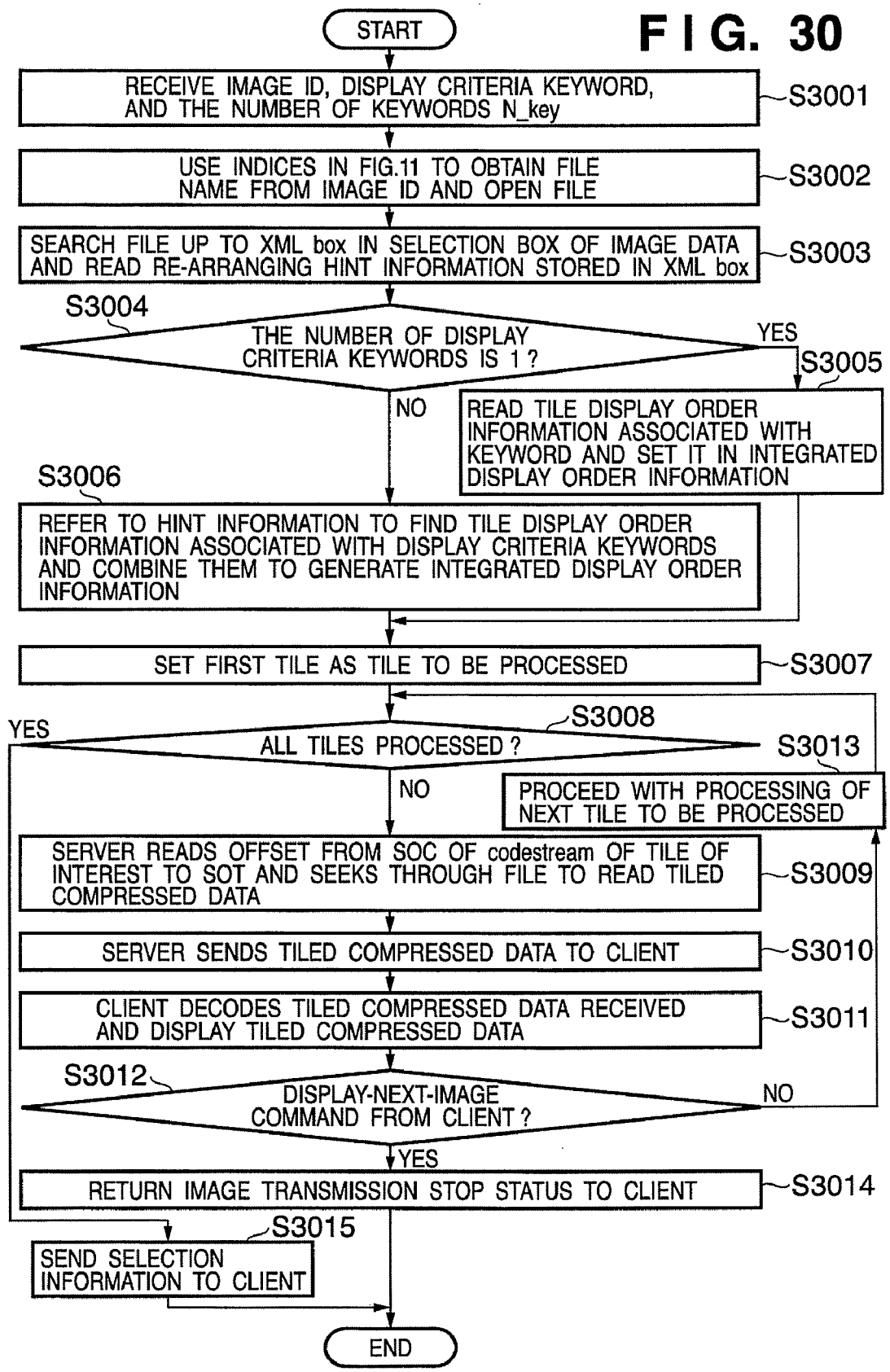
FIG. 30 shows a process flow for displaying an image at step S2912 shown in FIG. 29 according to the third embodiment of the present invention.

Adding tile index numbers in the order of tiles in the codestream D4 in this way can minimize the total amount of file search in the process at step S3009 of the flow in FIG. 30 in which the offset from the SOC marker to the SOT and the file is searched to read tiled compressed image data, because the integrated information complemented at step S3505 and the subsequent steps is used and backward search is avoided.

It will be understood that the same effect can be achieved by complementing the integrated display order information in the reverse order of appearance of the tiles in the codestream D4 because search is performed only in the backward direction and not in the forward direction.

Fifth Embodiment

A fifth embodiment relates to a process for reflecting tile index numbers in integrated display order information that are not reflected in processing at steps S3105 through S3108 in FIG. 31 in the third embodiment. In the fifth embodiment, the visual quality of images is considered, rather than such order of tile indices as ascending or descending order. In the following description, only the differences from the third embodiment will be described.

Figure 36:
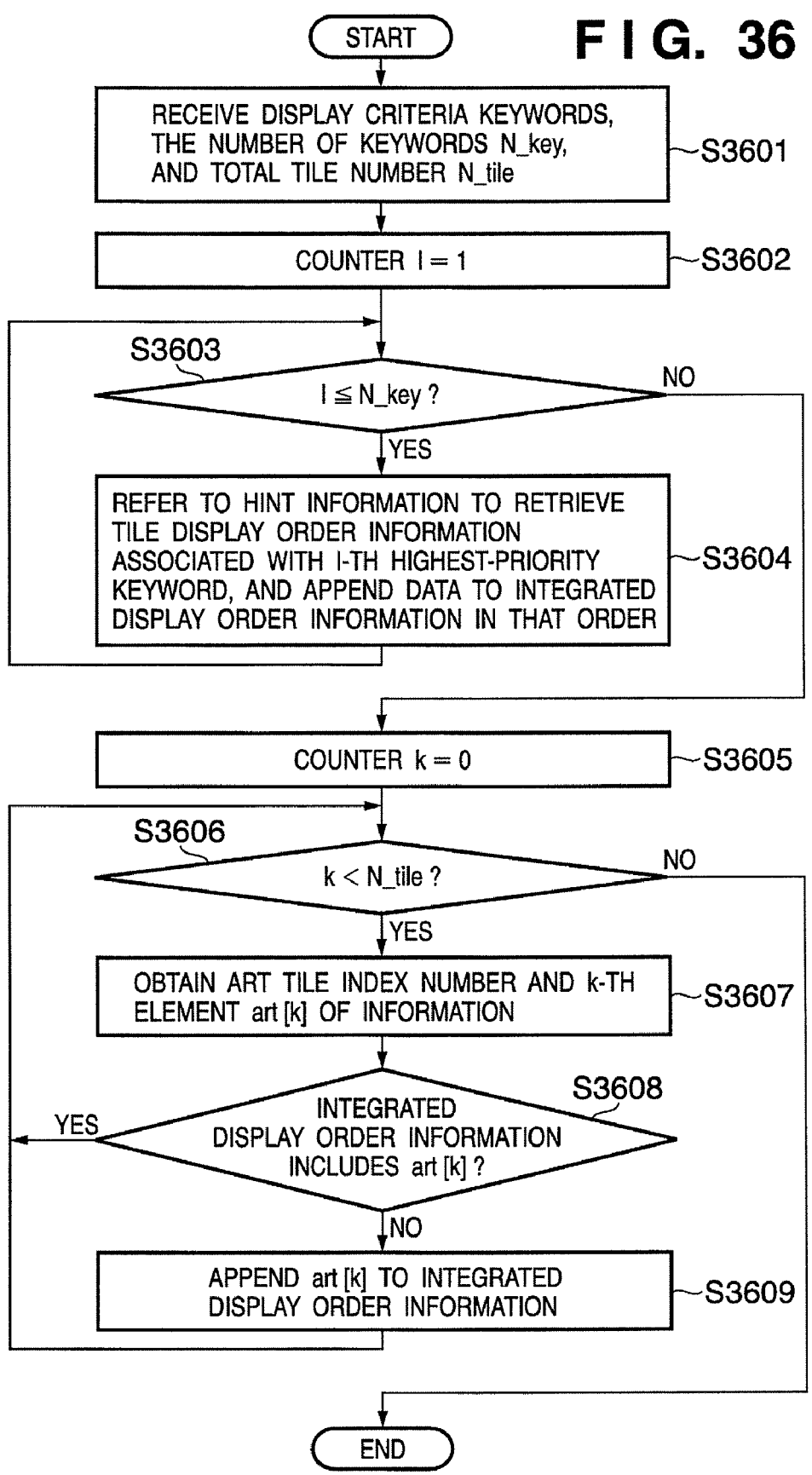
FIG. 36 shows a process flow for generating integrated display order information according to a fifth embodiment of the present invention.

Steps S3106 through S3108 in the process flow shown in FIG. 31 in the third embodiment are replaced with steps S3606 through S3609 in the process flow shown in FIG. 36 in the fifth embodiment. The operations in these steps in the fifth embodiment differ from the third embodiment.

In the third embodiment, comparison is made at step S3107 to determine whether index numbers are included in the integrated display order information, in order starting from tile index number T0. If a tile index number is not included in the integrated display order information, the process proceeds to step S3108 where the number is added to the integrated display order information. In the fifth embodiment, on the other hand, art tile index number order information as shown in FIG. 38 is used in order to display tiled compressed image data in accordance with a spiral ordering pattern starting from the center of the image as shown in FIG. 37, with consideration given to the visual quality of image display. The art tile index number order information is not specific to tiled compressed image data. Instead, it is dependent on the numbers of tiles in the rows and columns of tiled compressed image data. Therefore, the art tile index number order information does not need to be contained in the tiled compressed image data.

To check tiled compressed image data in the art tile index number order information in sequence in accordance with the order of the tiled compressed image data, starting from the beginning of the data, to see tile index numbers are included in the integrated display order information, the data array shown in FIG. 38 is first referenced to obtain the k-th tile index number in the number order information.

Then, the k-th tile index number is compared with the tile index numbers in the integrated display order information at step S3608. If an index number is not included in the integrate display order information, it is appended to the integrated display order information at step S3609.

Adding art tile index number order information in this way enables a good-visual-quality image display. It will be understood that multiple sets of art tile index number order information may be provided to allow a viewer of images to select one.

While the present invention has been described illustratively with respect to the first to fifth embodiments, the present invention is not limited to these embodiments. Many variations of the present invention are possible. Those variations also fall within the technical scope of the present invention.

For example, re-arranging hint information is stored in the XML box in the selection box D5 in the embodiments described above. However, the re-arranging hint information can be stored in a comment region of the main header in the codestream D4 or in a schema region that is an extension of J2K. It takes much time to check the selection box D5 because it is at the end of J2K compressed image data. Storing hint information in the comment region of the main header, which is before the position where re-arranging of data in the codestream D4 occurs, will conveniently facilitate the checking. Furthermore, XML data may be directly stored in the comment region.

If a storage region dedicated to hint information is provided in a region before the codestream, for example in general information D3 in image data, the hint information can be dealt with as information compatible with various application programs.

It will be understood that hint information does not necessarily need to be placed in a J2K file. For example, hint information associated with compressed image data may be stored outside the compressed image data if J2K compressed image data are managed in a DB system.

Transmission, distribution, and reception of compressed image data between the image compression data processing apparatus, which acts as a server, and a client terminal have been described by way of example with respect to the embodiments. However, such communications can be viewed as memory transfer or memory access within a PC. Therefore, according to the embodiments of the present invention, J2K compressed image data can also be efficiently displayed on a single PC.

In the embodiments described above, the original image data is replaced with image data in which compressed partial data are reordered in the ordering pattern most frequently specified and the reordered image data is stored. However, the reordered image data may be stored besides the original image data.

Statistical information about display modes specified is held in association with each piece of image data in the above embodiments. However, statistic information about block decoding order patterns specified by a viewer for all images may be stored and compressed partial data may be ordered in accordance with the most frequently specified block decoding ordering pattern.

Examples have been described with respect to the embodiments described above in which information about the access frequency of image data distributed or read is stored and the data with the earliest access date and time is deleted from the memory cache. However, the image data least frequently accessed may be deleted, of course.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-290370, filed on Oct. 3, 2005, which is hereby incorporated by reference herein in its entirety.

What is claimed is:

1. An image compression data processing method, comprising:
    dividing compressed image data into a plurality of compressed partial image data and describing the plurality of compressed partial image data in an arbitrary order;
    describing, in any of the compressed image data and additional data associated with the compressed image data, information about a decoding order of the plurality of compressed partial image data and information about a storage address of each of the plurality of compressed partial image data;
    decompressing, by a first data processing apparatus, the compressed image data and displays the decompressed image data;
    storing, by a second data processing apparatus, the compressed image data,
    wherein the first data processing apparatus and the second data processing apparatus are interconnected through a communications line;
    reading, by the second data processing apparatus, the plurality of compressed partial image data using the information about the storage address of each of the compressed partial image data in accordance with a decoding order of the plurality of compressed partial image data requested by the first data processing apparatus and sending the plurality of compressed partial image data to the first data processing apparatus;
    decompressing and displaying, at the first data processing apparatus, each of the plurality of compressed partial image data; and
    repeating the above steps for all of the plurality of compressed partial image data to display the decompressed image data.

2. The image compression data processing method according to claim 1, further comprising:
    reading the plurality of compressed partial image data in accordance with information about a requested decoding order of the plurality of compressed partial image data with reference to the information about the storage address of each of the plurality of compressed partial image data.

3. The image compression data processing method according to claim 1, further comprising:
    describing, in any of the compressed image data and the additional data associated with the compressed image data, comment information corresponding to the information about the decoding order of the plurality of compressed partial image data.

4. The image compression data processing method according to claim 3, wherein
    the comment information associated with the information about the decoding order of the plurality of compressed partial data is selected to specify the decoding order of the plurality of compressed partial image data.

5. The image compression data processing method according to claim 1, further comprising:
    at the first data processing apparatus which decompresses and displays the plurality of compressed partial image data, searching for and reading each of the plurality of compressed partial image data using the information about the storage address of each of the plurality of compressed partial image data in accordance with the information about the decoding order of the plurality of compressed partial image data;

decompressing the compressed partial image data; and displaying the decompressed image data;

wherein the above steps are repeated for all of the plurality of compressed partial image data.

6. The image compression data processing method according to claim 2, wherein in the process of the steps of reading, decoding, and displaying the plurality of compressed partial image data performed for all of the plurality of compressed partial image data in accordance with information about a requested decoding order of the plurality of compressed partial image data, determination is made, after at least one piece of the compressed partial image data is displayed, as to whether a process termination command is issued and, if the process termination command is issued, the process is terminated.

7. An image compression data processing method comprising:

using at least one data processor to perform:

dividing compressed image data into plurality of compressed partial image data and describing the plurality of compressed partial image data in an arbitrary order; and describing information about a decoding order of the plurality of compressed partial image data and information about a storage address of each of the plurality of compressed partial image data, in any of the compressed image data and additional data associated with the compressed image data, storing statistic information about information about the decoding order of the plurality of compressed partial image data;

storing the compressed image data consisting of the plurality of compressed partial image data arranged in the order most frequently specified; and if the most frequent decoding order is requested when the compressed image data is to be distributed or read, distributing or reading the stored compressed image data without changing the compressed image data.

8. The image compression data processing method according to claim 7, further comprising:

storing the statistic information about the decoding order of the plurality of compressed partial image data in each set of the compressed image data; and storing the compressed image data consisting of the plurality of compressed partial image data arranged in the most frequent decoding order.

9. The image compression data processing method according to claim 7, further comprising:

storing the statistic information about decoding order information for all the compressed image data; and storing the compressed image consisting of the plurality of compressed partial image data arranged in the most frequent decoding order.

10. The image compression data processing method according to claim 8, wherein a deviation in the decoding order information is compared with a threshold to determine whether to store the compressed image data consisting of the plurality of compressed partial image data arranged in accordance with the most frequent decoding order information.

11. The image compression data processing method according to claim 8, wherein when the compressed image data consisting of the plurality of compressed partial image data arranged is stored, the original compressed image data is replaced with the compressed image data.

12. The image compression data processing method according to claim 8, wherein when the compressed image data consisting of the plurality of compressed partial image data arranged is stored, at least one set of the original compressed image data is separately stored.

13. The image compression data processing method according to claim 7, further comprising:

storing in a memory cache the compressed image data together with an image ID paired with the information about the decoding order of the plurality of compressed partial image data; and in response to a request for the compressed image data, comparing the request with image IDs of the compressed image data in the memory cache and, if matching compressed image data is in the memory cache and information about a requested decoding order matches information about the decoding order of the plurality of compressed partial image data, reading the matching compressed image data in the memory cache.

14. The image compression data processing method according to claim 13, further comprising:

in response to a request for the compressed image data, comparing the request with the image IDs of compressed image data in the memory cache; and if matching compressed image data is not in the memory cache or a specified decoding order does not match information about the decoding order of the plurality of compressed partial image data in the memory cache, reading compressed image data, and storing the read compressed image data and a pair of the image ID and information about the decoding order in the memory cache.

15. The image compression data processing method according to claim 13, further comprising:

storing information about the frequency of access to the compressed image data distributed or read; and deleting any of the least frequently accessed compressed image data and the earliest accessed compressed image data from the memory cache.

16. The image compression data processing method according to claim 7, further comprising:

storing the compressed image data together with an image ID paired with the decoding order information into the memory cache; and in response to a request for compressed image data, comparing the request with the image IDs of compressed image data in the memory cache and if matching compressed image data is not in the memory cache or a specified decoding order does not match information about the decoding order of the compressed image data in the memory cache and a requested decoding order matches the order of the compressed image data, reading the compressed image data the order of which matches the requested decoding order from the memory cache without changing the order of the compressed image data.

17. The image compression data processing method according to claim 13, further comprising:

storing the compressed image data together with an image ID paired with the decoding order information into the memory cache; and in response to a request for compressed image data, comparing the request with the image IDs of the compressed image data in the memory cache and, if matching compressed image data is in the memory cache but a requested decoding order does not match information about the decoding order of the compressed image data in the memory cache and the requested decoding order does not match the order of the compressed image data, reading the compressed image data having the matching image ID from the memory cache.

18. An image compression data processing method, comprising:
using at least one data processor to perform:
dividing compressed image data into a plurality of compressed partial image data and describing the plurality of compressed partial image data in an arbitrary order;
assigning a keyword to an object in the image; and
describing a priority decoding order of the plurality of compressed image data as hint information in any of the compressed image data and additional data associated with compressed image data so that compressed partial image data corresponding to the object to which the keyword is assigned is decoded and displayed in priority to the other partial image data.

19. The image compression data processing method according to claim 18, wherein
information about the storage address of each of the compressed partial image data in the compressed image data is descried as the hint information in any of the compressed image data and the additional data associated with the compressed image data.

20. The image compression data processing method according to claim 18, wherein
the decoding order of the plurality of compressed partial image data is specified by selecting the keyword associated with the decoding order of the plurality of compressed partial image data.

21. The image compression data processing method according to claim 18, further comprising:
specifying keyword search criteria;
searching for an image by comparing the keyword search criteria with the keyword assigned to the compressed image data; and
displaying hit compressed image data in accordance with the priority decoding order of the plurality of compressed partial image data, the priority decoding order being associated with the search keyword.

22. The image compression data processing method according to claim 18, further comprising:
specifying keyword search criteria and a display criteria keyword;
searching an image by comparing the search keyword criteria with a keyword assigned to the compressed image data; and
displaying hit compressed image data in accordance with the priority decoding order of the plurality of compressed partial image data, the priority decoding order being associated with the display criteria keyword.

23. The image compression data processing method according to claim 22, wherein
the display criteria keyword is the keyword used as the search keyword.

24. The image compression data processing method according to claim 22, further comprising:
if there are a plurality of the display criteria keywords, combining the decoding orders of the plurality of compressed partial image data on the basis of the priorities of criteria for displaying the compressed partial image data found by a search in priority to the other compressed partial image data to generate an integrated priority decoding order of the plurality of compressed partial image data.

25. The image compression data processing method according to claim 24, wherein
for the compressed partial image data that does not meet criteria for displaying in priority to the other compressed partial image data, the decoding order is appended to the compressed partial image data that meets the criteria in accordance with a predetermined order information to generate the integrated priority decoding order of the plurality of compressed partial image data, the integrated priority decoding order being generated with consideration given to the efficiency of file searching.

26. The image compression data processing method according to claim 25, wherein
the predetermined order information is any of descending order and ascending order of the plurality of compressed partial image data.

27. The image compression data processing method according to claim 25, wherein
the predetermined order information is any of descending order and ascending order of compressed partial image data in compressed partial image data.

28. The image compression data processing method according to claim 25, wherein
the predetermined order information is any of a single decoding order determined in consideration given to the visual quality of image display and a decoding order selected from a plurality of the decoding orders.

29. The image compression data processing method according to claim 19, wherein
in the step of displaying the plurality of compressed image data in accordance with the priority decoding order of the plurality of compressed image data, the plurality of compressed partial image data are read by referring to the storage address information of the plurality of compressed partial image data.

30. The image compression data processing method according to claim 18, wherein
a first data processing apparatus which decompresses the plurality of compressed partial image data and displaying the decompressed plurality of image data and a second data processing apparatus which stores the plurality of compressed partial image data are interconnected through a communications line;
the image compression data processing method further comprising:
reading, by the second data processing apparatus, the plurality of compressed partial image data by using information about the storage address of each of the plurality of compressed partial image data in accordance with the decoding order of the plurality of compressed partial image data, the decoding order being specified from the first data processing apparatus, and sending the plurality of compressed partial image data to the first data processing apparatus;
at the first data processing apparatus, decompressing each of the plurality of compressed partial image data and displaying the decompressed partial image data; and
repeating the above steps for all of the plurality of compressed partial image data to display the decompressed image data.

31. The image compression data processing method according to claim 30, further comprising:

at the first data processing apparatus which decompresses and displays the plurality of compressed partial image data, searching for and reading each of the plurality of compressed partial image data using the information about the storage addresses of the plurality of compressed partial image data in accordance with the information about the decoding order of the plurality of compressed partial image data;

decompressing the compressed partial image data; and displaying the decompressed image data;

wherein the above steps are repeated for all of the plurality of compressed partial image data.

32. The image compression data processing method according to claim 21, wherein in the process of the steps of reading, decoding, and displaying the plurality of compressed partial image data performed for all of the plurality of compressed partial image data in accordance with information about a requested decoding order of the plurality of compressed partial image data, determination is made, after at least one piece of the compressed partial image data is displayed, as to whether a command to display the next image is issued and, if the command is issued, the process is terminated and the process for displaying the next hit image is performed.

33. The image compression data processing method according to claim 21, wherein in the process of the steps of reading, decoding, and displaying the plurality of compressed partial image data performed for all of the plurality of compressed partial image data in accordance with information about a requested decoding order of the plurality of compressed partial image data, determination is made, after at least one piece of compressed image data is displayed, as to whether a process termination command is issued and, if the process termination command is issued, the compressed image data currently being processed for display is saved and the process is terminated.

34. An image compression data processing apparatus, comprising:

a unit which divides compressed image data into a plurality of compressed partial image data and describes the plurality of compressed partial image data in an arbitrary order;

a unit which describes information about a decoding order of the plurality of compressed partial image data and information about the storage address of each of the compressed partial image data, in any of the compressed image data and additional data associated with the compressed image data;

a first data processing which decompresses the compressed image data and displays the decompressed image data and a second data processing apparatus which is connected with the first data processing apparatus through a communications line and stores the compressed image data, wherein the second data processing apparatus reads compressed partial image data by using the information about the storage address of each of the compressed partial image data in accordance with a decoding order of the compressed partial image data, the decoding order being specified by the first data processing apparatus, and sends the read compressed partial image data to the first data processing apparatus;

the first data processing apparatus decompresses the compressed partial image data it received and displays the decompressed partial image data; and the above process is repeated for all of the plurality of compressed partial image data to display the decompressed image data.

35. An image compression data processing apparatus, comprising:

a unit which divides the compressed image data into a plurality of compressed partial image data and describes the plurality of compressed partial image data in an arbitrary order;

a unit which describes information about a decoding order of the plurality of compressed partial image data and information about the storage address of each of the compressed partial image data, in any of the compressed image data and additional data associated with the compressed image data;

a unit which stores statistic information about information about the decoding order of the plurality of compressed partial image data;

a unit which stores the image data consisting of the plurality of compressed partial image data arranged in the order most frequently specified; and a unit which distributes or reads the stored compressed image data without changing the compressed image data if the most frequent decoding order is requested when the compressed image data is to be distributed or read.

36. The image compression data processing apparatus according to claim 35, further comprising:

a unit which stores in a memory cache the compressed image data together with an image ID paired with the information about the decoding order of the plurality of compressed partial image data;

a unit which, in response to a request for compressed image data, compares the request with the image IDs of the compressed image data in the memory cache; and a unit which, if matching compressed image data is in the memory cache and information about a requested decoding order information matches information about the decoding order of plurality of compressed partial image data, reads the matching compressed image data in the memory cache.

37. An image compression data processing apparatus comprising:

a unit which divides compressed image data into a plurality of compressed partial image data and describes the plurality of compressed partial image data in an arbitrary order;

a unit which assigns a keyword to an object in the image; and a unit which describes a priority decoding order of the plurality of compressed partial image data as hint information in any of the compressed image data and additional data associated with compressed image data so that the plurality of compressed partial image data corresponding to the object to which the keyword is assigned is decoded and displayed in priority to the other partial image data.

38. The image compression data processing apparatus according to claim 37, further comprising:

a unit which specifies keyword search criteria;

a unit which searches for an image by comparing the keyword search criteria with the keyword assigned to the compressed image data; and a unit which displays hit compressed image data in accordance with a priority decoding order of the plurality of compressed partial image data, the priority decoding order being associated with the search keyword.

39. The image compression data processing apparatus according to claim 37, further comprising:

a unit which specifies the keyword search criteria and display criteria keyword;

a unit which searches an image by comparing the search keyword criteria with the keyword assigned to the compressed image data; and a unit which displays hit compressed image data in accordance with the priority decoding order of compressed partial image data, the priority decoding order being associated with the display criteria keyword.

40. The image compression data processing apparatus according to claim 39, further comprising:

a unit which, if there are a plurality of display criteria keywords, combines the decoding orders of the plurality of compressed partial image data on the basis of the priorities of criteria for displaying compressed partial image data found by a search in priority to the other compressed partial image data to generate an integrated priority decoding order of the plurality of compressed partial image data.

* * * * *